United States Patent
McCullough, Jr.

[11] Patent Number: 5,858,530
[45] Date of Patent: *Jan. 12, 1999

[54] FLEXIBLE IGNITION RESISTANT BIREGIONAL FIBER, ARTICLES MADE FROM BIREGIONAL FIBERS, AND METHOD OF MANUFACTURE

[76] Inventor: Francis P. McCullough, Jr., 2322 Ridgewood Dr., West Columbia, Tex. 77486

[*] Notice: The term of this patent shall not extend beyond the expiration date of Pat. No. 5,700,573.

[21] Appl. No.: 750,513

[22] PCT Filed: Apr. 25, 1996

[86] PCT No.: PCT/US96/06320
§ 371 Date: Dec. 5, 1996
§ 102(e) Date: Dec. 5, 1996

[87] PCT Pub. No.: WO96/34134
PCT Pub. Date: Oct. 31, 1996

[51] Int. Cl.$^6$ ............................... D02G 3/00; D01F 9/12
[52] U.S. Cl. ..................... 428/367; 428/373; 423/447.1; 423/447.3
[58] Field of Search .................................. 428/367, 364, 428/373; 423/447.1, 447.3

[56] References Cited
U.S. PATENT DOCUMENTS
5,700,573 12/1997 McCullough .......................... 428/367

Primary Examiner—Newton Edwards
Attorney, Agent, or Firm—Nis H. Juhl

[57] ABSTRACT

A flexible, ignition resistant, biregional fiber is disclosed, wherein the fiber is preferably derived from a single homogeneous polymeric precursor composition, said biregional fiber comprising an inner core region of a thermoplastic polymeric composition and a surrounding outer sheath region of a thermoset carbonaceous material. The biregional fiber is particularly characterized by having a ratio of the radius of the core region with respect to the total radius of the fiber (r:R) of from about 1:4 to about 1:1.05, an LOI value of greater than 40, a breaking twist angle of from 4 to 13 degrees, and a bending strain value of from greater than 0.01 to less than 50%. In a further embodiment of the invention, a biregional precursor fiber is disclosed, wherein the biregional precursor fiber is preferably derived from a single homogeneous polymeric composition, and wherein said precursor fiber comprises an inner core region of a thermoplastic polymeric composition and a surrounding outer sheath region of a oxidation stabilized, thermoplastic polymeric composition. The precursor fiber is particularly characterized by having a breaking twist angle of from 17 to 23 degrees. The invention further resides in a method of making the ignition resistant biregional fiber. Preferred end uses for the ignition resistant biregional fibers are disclosed including thermal insulation; flame resistant and fire blocking insulation; blends of the biregional fibers with other natural or polymeric fibers; coated fibers, composites of a polymeric matrix reinforced with the biregional fibers of the invention, electron conductive fibers for battery electrodes, and the like.

11 Claims, 3 Drawing Sheets

5,858,530

FLEXIBLE IGNITION RESISTANT BIREGIONAL FIBER, ARTICLES MADE FROM BIREGIONAL FIBERS, AND METHOD OF MANUFACTURE

FIELD OF THE INVENTION

The present invention relates to a flexible, ignition resistant biregional fiber derived from a precursor fiber preferably having a homogeneous polymeric composition throughout the cross-section of the precursor fiber, wherein the ignition resistant biregional fiber has an inner core region of a thermoplastic polymeric composition and a surrounding outer sheath region of a thermoset carbonaceous material. The invention also relates to a biregional precursor fiber having an inner core region of a thermoplastic polymeric composition and a surrounding oxidation stabilized outer sheath region, a method for the manufacture of the biregional fiber, and articles made from a multiplicity of said biregional fibers.

In both of the biregional precursor fiber and the biregional fiber, the ratio (r:R) of the radius of the core region (r) with respect to the total radius (R) of the biregional fiber is from 1:4 to 1:1.05, preferably from 1:3 to 1:1.12. Preferably, the biregional precursor fiber of the invention has a density of from 1.20 g/cm$^3$ to 1.32 g/cm$^3$, and a breaking twist angle of from about 17 to about 23 degrees, while the biregional fiber of the invention is ignition resistant and has an LOI value of greater than 40. The biregional fiber is flexible and lacks the brittleness normally associated with carbon and graphitic fibers of the prior art. The biregional fiber has a breaking twist angle of from 4 to 13 degrees, a density ranging from 1.45 to 1.85 g/cm$^3$ and as high as 1.87 g/cm$^3$, a bending strain value of from greater than 0.01 to less than 50%, preferably from 0.1 to 30%, and a Young's modulus of from less than 1 MM psi (<6.9 GPa) to 50 MM psi (345 GPa), preferably from 1 MM psi to 30 MM psi (207 GPa).

BACKGROUND OF THE INVENTION

Resilient and flexible, linear and non-linear carbonaceous fibers are now well known in the art. Representative of non-linear carbonaceous fibers is U.S. Pat. No. 4,837,076, issued Jun. 6, 1989 to McCullough et al. The fibers are produced by melt or wet spinning fibers from a thermoplastic polymeric composition and then stabilizing the fibers by treating them in an oxygen containing atmosphere and at an elevated temperature for a predetermined period of time. The oxidation stabilization treatment of the fibers is carried out to the extent such that the entire polymeric composition of the fibers, when viewed in cross-section, is oxidized. Although the stabilization process, to some extent, depends on the diameter of the fibers, the composition of the polymeric precursor composition, the level of oxygen in the atmosphere, and the treatment temperature, the process is extremely time consuming and costly in order to achieve complete stabilization of the fibers throughout their cross section.

Traditionally, the stabilization treatment of polymeric fibers under oxygen extends over at least several hours to in excess of 24 hours to completely permeate the fibers with oxygen and to achieve sufficient stabilization of the fibers in preparation for subsequent carbonization of the stabilized fibers to produce carbonaceous fibers for commercial end uses. The Encyclopedia of Polymer Science and Engineering, Vol. 2, A Wiley-Interscience Publication, 1985, pp. 641–659, reports that "current standard processing technology requires from 1 to 2 hours for adequate stabilization" of fibers, p.658. No other method of processing suitable for large or "heavy" 320 k tows is disclosed. Also, in "High Performance Fibers II, published by Battelle, esp. the chapter entitled "Process Technology-Oxidation/Stabilization", page 149 et seq. it is reported that oxidation and cyclization takes place between 150° C.–300° C. and that "the reaction must take place throughout the fiber and not be confined to the fiber surface." Accordingly, the lengthy stabilization treatment employed in present standard procedures reduces the productive output of stabilized fibers, requires substantial capital investment, and is therefor extremely costly and a major deterrent in rendering the process desirable for greater commercial exploitation, i.e. extended commercial usage of the fibers at lower cost. It is also reported that if electrically heated oxidation chambers are used, the chambers must be substantially larger than the ovens used in a subsequent carbonization step, therefore resulting in a substantially higher capital cost.

It is further taught in U.S. Pat. No. 4,837,076 that the conventionally stabilized fibers (stabilized precursor fibers) are subsequently formed into a coil-like and/or sinusoidal shape by knitting or weaving a fiber tow into a fabric or cloth. The so formed knitted fabric is thereafter heat treated in a relaxed and unstressed condition and in a non-oxidizing atmosphere at a temperature of from 525° C. to 750° C. and for a period of time sufficient to produce a heat induced thermoset reaction wherein additional crosslinking and/or cross chain cyclization occurs between the original polymer chains. The carbonization treatment of the fibers is carried out to the extent such that the entire oxidation stabilized material of the precursor fibers, when viewed in cross-section, is carbonized. Specifically, no residual portion of the oxidation stabilized fiber material remains in a thermoplastic condition. In example 1 of U.S. Pat. No. 4,837,076, it is reported that portions of a stabilized knitted cloth were heat set at temperatures ranging from 550° C. to 950° C. over a 6 hour period. The most flexible fibers and fibers that are subject to the least fiber breakage due to brittleness when subjected to textile processing were obtained in those fibers that had been heat treated at a temperature of from 525° C. to 750° C. The resulting fiber tows, obtained by deknitting the cloth, and having the heat set, i.e. thermoset, non-linear structural configuration, can then be subjected to other methods of treatment known in the art to create an opening, a procedure in which a yarn or the fiber tows of the cloth are separated into an entangled, wool-like fluffy material, in which the individual fibers retain their coil-like or sinusoidal configuration, yielding a fluff or batting-like body of considerable loft.

U.S. Pat. No. 4,837,076 also discloses that at a treatment temperature above 1000° C. the stabilized precursor fibers become graphitic and highly electrically conductive to the point where they begin to approach the conductivity of a metallic conductor. These graphitic fibers find special utility in the manufacture of electrodes for energy storage devices. Since graphitization of the stabilized fibers is carried out at a temperature and for a period of time such that the entire stabilized polymeric material of the fiber, when viewed in cross-section, is graphitized, the process, especially at the higher temperatures, is extremely time and energy consuming and equipment intensive, and therefor very costly.

Graphitization of oxidation stabilized fibers is generally desired in order to produce higher tensile modulus properties in the fibers. However, it is reported in High Performance Fibers II, published by Battelle, Copyright 1987, esp. the chapter entitled "Process Technology-Graphitization", pages 158 and 159, that "breakage of the fibers is a problem that has not been solved" and that "the most serious disadvantage of these high tensile strength fibers is their low strain-to-failure ratio, which means that they are very brittle". Moreover, the process is also said to be expensive because of the "high capital cost of the equipment and the great amount of electrical energy required to achieve the necessary temperature for graphitization of the fibers (2000° to 3000° C.) throughout their entire cross-section.".

Fibers that are generally referred to as "bicomponent or composite fibers", "biconstituent fibers", "bilateral fibers" and "sheath-core fibers" are commonly known in the art. Definitions of these terms can be found in "Man-Made Fiber and Textile Dictionary", Hoechst Celanese Corporation, 1990, pp. 14, 15, 32, and 139. A bicomponent or composite fiber is defined as a fiber composed of two or more polymer types in a sheath-core or side by side (bilateral) relationship. Biconstituent fibers are defined as fibers that are extruded from a homogeneous mixture of two different polymers wherein such fibers combine the characteristics of the two polymers into a single fiber. Bilateral fibers are two generic fibers or variants of the same generic fiber extruded in a side by relationship. Sheath-core fibers are bicomponent fibers of either two polymer types or two variants of the same polymer. One polymer forms a core and the other polymer of a different composition surrounds it as a sheath.

Bicomponent fibers have also been generally disclosed in U.S. Pat. No. 4,643,931, issued Feb. 17, 1987 to F. P. McCullough et al. These fibers are blends of a small amount of conductive fibers into a yarn to act as an electrostatic dissipation element. Fiber manufacturers also routinely manufacture conductive fibers by incorporating into a hollow fiber a core of carbon or graphite containing thermoplastic composite or by coating a fiber with a sheath made of a thermoplastic composite containing carbon or graphite.

U.S. Pat. No. 5,260,124, issued Nov. 9, 1993 to J. R. Gaier, discloses a hybrid material comprising a fabric of high strength carbon or graphite fibers, a layer of a graphitized carbon disposed on the fibers, and an intercalate in the layer. In the process of manufacture, Gaier's fabric of high strength carbon or graphitic fibers is coated by vapor deposition with a porous graphite layer to form a two-dimensional fabric like structure. In contrast to Gaier, the fibers of the invention are "biregional" and are not carbonized or graphitized throughout to form a high strength fiber, nor are the ignition resistant biregional fibers of the invention coated with a layer of graphitized carbon, thereby forming a composite structure. The core region of the fiber of the invention always remains thermoplastic, while the sheath region of the fiber is oxidation stabilized and thermoplastic, or carbonaceous and thermoset Moreover, the ignition resistant biregional fiber of the invention does not require an intercalate treatment in the outer graphite layer.

Electrical energy storage devices, particularly batteries, which employ fibrous carbon or graphite electrodes and which operate in a nonaqueous electrolyte at ambient temperature are known from U.S. Pat. No. 4,865,931, issued Sep. 12, 1989 to F. P. McCullough et al. The patent generally discloses a secondary battery comprising a housing having at least one cell positioned in the housing, each cell comprising a pair of electrodes made of a multiplicity of electrically conductive carbon fibers, a foraminous electrode separator for electrically insulating the electrodes from contact with each other, and an electrolyte comprising an ionizable salt in a nonaqueous fluid in each cell.

A similar electrical storage device is disclosed in U.S. Pat. No. 4,830,938 to F. P. McCullough et al, issued May 16, 1989. This patent discloses a shared bipolar, carbonaceous fibrous, electrode which is capable of carrying a current from one cell to an adjacent cell without a current collector frame associated therewith. Neither of the aforementioned McCullough et al patents disclose the use of ignition resistant biregional fibers having an inner core region of a thermoplastic polymeric composition and a surrounding outer sheath region of a thermoset carbonaceous material. The biregional fibers of the invention are particularly suitable for use as electrodes in secondary energy storage devices primarily in view of their substantially greater flexibility and lower cost.

In general, the biregional fibers of the invention distinguish over the various types of fibers of the prior art in that the biregional fiber is preferably produced from a homogenous polymeric composition, i.e. a single polymeric composition, preferably an acrylic polymer, in which an outer region of the fiber is oxidation stabilized and then carbonized to form two visually distinct regions in the fiber, when viewed in cross section, i.e. typically a translucent or lightly colored inner core region and a black outer sheath region. In the case of a biregional precursor fiber, the fiber comprises a thermoplastic inner core and a thermoplastic stabilized outer sheath, while in the case of an ignition resistant biregional fiber, the inner core is thermoplastic and the outer sheath is thermoset and carbonized.

When the ignition resistant biregional fiber of the invention is manufactured from a homogeneous polymeric composition, preferably an acrylic polymer, there is no boundary or discontinuity between the inner core and the outer oxidation stabilized or carbonized sheath. The term "homogeneous polymeric composition" used herein includes homopolymers, copolymers and terpolymer and does not include fibers containing two or more polymers of different compositions and coefficients of crystallinity. In contrast discontinuities are produced in bilayered or bicomponent fibers in which two polymers of different compositions are used in a side by side or core-sheath relationship. Such discontinuities or boundaries occur between the layers of the different polymeric compositions due to their different coefficients of crystallinity. This also applies to different polymeric compositions which are intermixed with each other.

In the case of a core/sheath fiber, the outer sheath layer is formed much like a skin layer and is separate and distinct from the inner core thus forming a physical boundary or discontinuity between the inner core and the outer skin layer. More specifically, in viewing a cross sectional surface of a bilayered or sheath-core fiber (generally coextruded), inspection of the surface from an outer periphery to the center of the fiber surface, one would pass from one type of polymeric composition forming the outer sheath layer through a boundary layer or discontinuity into the core having another polymeric composition of different crystallinity. As previously indicated, polymers having different compositions also have different coefficients of crystallinity and melting points. For example, polyacrylonitrile will undergo a melting point transition at a temperature range of 320° C.–330° C. This represents a relatively high melting point for polymers and is characteristic of stiff chains. Both nylon 6,6 and PET fibers melt at 265° C., and polyolefins such as polyethylene and polypropylene melt around 135° C. and 165° C., respectively. Accordingly, although the inner core and the outer sheath of the biregional fiber of the invention forms two visually distinct regions, when viewed in cross section, they do not form a physical boundary or discontinuity between the core and the sheath, i.e. the regions are continuous.

The single homogenous polymeric composition that is preferably employed in the manufacture of the ignition resistant biregional fiber of the invention is a standard acrylic polymer, i.e. homopolymer, copolymers and terpolymers of acrylonitrile, wherein the copolymers and terpolymers contain at least 85 mole percent acrylic units and up to 15 mole percent of one or more vinyl monomers copolymerized therewith, or optionally, a subacrylic polymer, as hereinafter disclosed.

DEFINITIONS

The terms "biregional fiber", "ignition resistant biregional fiber" and "BRF" are interchangeably used herein and generally refer to a fiber that is preferably produced from a single homogeneous polymeric composition, e.g. acrylic polymers, including homopolymers, copolymers, terpolymers, and the like, comprising an inner core region of a thermoplastic polymeric composition and a surrounding outer sheath region of a thermoset carbonaceous material. It is entirely possible, however, and well within the skill of the artisan, to produce the biregional fiber from two or more polymers of different compositions and coefficients of crystallinity, particularly where additional performance properties are desired. Specifically, the biregional fiber can be produced in a sheath-core configuration, where the sheath is of an acrylic or other suitable carbonizable precursor composition and the core is composed of a compatible polymer such as a modacrylic or, subacrylic polymer, PVC (polyvinyl chloride), modified PVC, or the like. It will be readily apparent to the artisan that stabilization and carbonization of a sheath-core fiber can result in an outermost region of a thermoset carbonized material, an intermediate transition region of a stabilized thermoplastic polymer, both of which are derived from a first polymeric composition, and a thermoplastic inner core composed of a second polymeric composition, different from the first polymeric composition. This sheath-core fiber could therefor consist of an ignition resistant outer carbonaceous sheath, an intermediate region, and an inner core of a thermoplastic composition for imparting flexibility and tenacity to the fiber.

The term "homogeneous" when applied to a homogeneous polymeric composition, refers to a composition which is uniformly the same i.e. made up of a single polymeric composition having a single coefficient of crystallinity and melting point.

The terms "biregional precursor fiber" or "BRPF" are interchangeably used herein and apply to a fiber which is preferably derived from a single homogeneous polymeric composition although it is also intended to be within the scope of the invention to include mixtures comprising a homogeneous polymeric composition having inert submicron particles, or the like, distributed throughout the composition. The BRPF of the invention is distinguished over the present state of the art by having an inner core region of a thermoplastic polymeric composition and an oxidatively stabilized surrounding outer sheath region. The outer stabilized sheath region of the fiber has a high softening to no softening temperature and is capable of withstanding the higher temperature conditions of carbonization without detrimental effect on the fiber, i.e. carbonization of the fiber does not affect the integrity of the thermoplastic composition of the inner core since it is shielded by the surrounding stabilized outer sheath region. The BRPF of the invention further differentiates over fully oxidation stabilized fibers (OPF) of the prior art by their increase in the breaking twist angle which ranges from 17 to 25 degrees without exhibiting any shear. In contrast, standard OPF fibers shear at a breaking twist angle of from 15 to 17 degrees.

The BRPF of the invention becomes, in effect, a "biregional precursor fiber", as defined, for preparation of the BRF, i.e. an ignition resistant biregional fiber having an outer carbonized sheath region. Oxidation and cyclization of the polymeric fiber generally takes place at a temperature of between 150° C. to 350° C. and for a length of time sufficient (greater than 5 minutes but typically less than 180 minutes) to produce an outer sheath of oxidation stabilized thermoplastic polymeric material of any desired thickness. It will be understood, that stabilization of a polymeric composition can be accomplished by means other than "oxidation" as, for example, by chemical oxidants applied at lower temperatures.

The terms "ignition resistant" or "non-flammable" used herein generally refers to the property of a specimen which will not sustain combustion in air when subjected to an ignition source (a flame source) at a temperature of 1000° C. or greater. Ignition resistance is determined by a LOI test which is also known as the "oxygen index" or "limited oxygen index" (LOI) test With this procedure the concentration of oxygen in $O_2/N_2$ mixtures is determined at which a vertically mounted specimen, when ignited at its upper end, just continues to burn. The size of the specimen is 0.65–0.3 cm wide and has a length from 7 to 15 cm. The LOI value is calculated according to the equation:

$$LOI = \frac{[O_2]}{[O_2 + N_2]} \times 100$$

The term "carbonaceous sheath region" used herein applies to the resultant outer sheath region of BRF produced by the carbonization of at least a portion of the outer stabilized region of a BROF which is carded out in an inert atmosphere and at an elevated temperature and in which the existing carbon-to-carbon bonds are maintained and new carbon-to-carbon linkages are established while eliminating oxygen, hydrogen and nitrogen from the molecular structure of the outer region and without causing a complete carbonization throughout the cross-section of the fiber. Depending on the particular end use desired, the outer carbonaceous sheath region of the fiber can be carbonized to a carbon content of greater than 68% and up to graphitization where the carbon content exceeds 98% by weight The term "Carbon fiber" is known and generally applies to a fiber having a uniform carbon content throughout a cross section of the fiber of greater than 92%, while the term "graphite fiber"or "graphitic fiber" is generally applied to a fiber having a uniform carbon content throughout a cross section of the fiber of greater than 98%. It is intended herein that the term "carbonaceous" applies to the outer sheath region of the ignition resistant biregional fiber, BRF, of the invention which has been carbonized to a carbon content of greater than 68% by weight.

The term "thermoset" used herein applies to polymeric compositions that have undergone a heat induced cross linking reaction of the molecular constituents to irreversibly "set" the polymer. A thermoset polymer has essentially no tendency to melt or soften under carbonization conditions and will not exhibit any breakage of the outer carbonized region of the fiber, for example, when the fiber is subjected to a twist angle of greater than 5 degrees (as defined herein after). The breaking twist angle varies, of course, and is dependent on the degree of carbonization, i.e. carbon content of the outer carbonized sheath, and the depth of carbonization into the fiber. The breaking twist angles for different types of biregional fibers of the invention are set forth in Table II following.

The term "bending strain" as used herein is as defined in Physical Properties of Textile Fibers by W. E. Morton and J. W. S. Hearle. The Textile Institute, Manchester, England (1975), pages 407–409. The percent bending strain on a fiber can be determined by the equation S=(r/R)×100 where S is the percent bending strain, r is the effective cross sectional fiber radius and R is the radius of curvature of the bend. That is, if the neutral plane remains in the center of the fiber, the maximum percentage tensile strain, which will be positive on the outside and negative on the inside of the bend, equals (r/R)×100 in a circular cross section of the fiber.

The term "flexible" used herein is specifically applicable to BRFs having a bending strain value of from greater than 0.01 to less than 50%, preferably from 0.1 to 30%.

The term "Breaking twist angle, α" as used herein is as defined in Physical Properties of Textile Fibers by W. E. Morton and J. W. S. Hearle. The Textile Institute, Manchester, England (1975), pages 421–425. If a fiber is twisted far enough, it will eventually break. The breaking point at which this occurs is called the "breaking twist" The number of turns until rupture is inversely proportional to the fiber diameter. To obtain a characteristic property of the fiber material, one may use the breaking-twist angle, α. This is the angle through which the outer layer can be twisted until it is sheared and is given by the formula:

$$\tan \alpha = \pi d \, \tau b$$

where d=diameter of the fiber and τb=breaking twist in turns per unit length.

The term "shear sensitivity" used herein generally applies to the tendency of a fiber to become fractured along a plane in the cross section of a fiber as a result of forces such as those caused by twisting. In practical terms, when fibers are subjected to certain textile operations such as the drafting operation in a yarn blending process, the drafting rollers exert significant shear on the fibers being drafted. Shear sensitive fibers exhibit extensive damage, if not complete breakage, whereas shear resistant fibers do not exhibit any significant breakage in this process step.

Conversely, the term "shear resistant" is applied to fibers which do not tend to break significantly when exposed to textile process operations such as drafting or twisting which exert significant shear stresses on the fibers being processed.

The term "bulk resistivity" used herein generally applies to the effective resistivity of an ignition resistant biregional fiber taking into account the specific resistivity of the composition of each region and the proportion of area represented by each region, i.e., the particular ratio (r:R) as it applies to a fiber with predetermined selected properties.

The term "polymeric composition" used herein include those polymeric materials as defined in Hawley's Condensed Chemical Dictionary, Eleventh Edition, page 938.

The term "crimp" as used herein applies to the waviness or nonlinearity of a fiber or fiber tow, as defined in "Man Made Fiber and Textile Dictionary" by Celanese Corporation.

The term "Fiber Assembly" used herein applies to a multiplicity of BRPFs or BRFs that are in the form of a yarn, a wool like fluff, a batting, mat, web or felt, a blend of the BRPFs or BRFs with other natural or polymeric fibers, a compression formed sheet, screen or panel of the fibers, generally with a small percentage of less than 10% of a binder especially binder fibers, a knitted or woven cloth or fabric, or the like.

The term "Cohesion" or "Cohesiveness" used herein, applies to the force which holds fibers together, especially during yarn manufacture. It is a function of the type and amount of lubricant used and the fiber crimp.

The term "aspect ratio" is defined herein as the length to diameter (l/d) ratio of a fiber.

All percentages given herein are in "percent by weights" unless otherwise specified.

SUMMARY OF THE INVENTION

The present invention comprises a major departure from the present state of the art in that it is now no longer necessary to completely oxidatively stabilize polymeric fibers throughout their cross section, but that such fibers can now be made into biregional oxidatively stabilized precursor fibers (BRPF) by limiting the extent of stabilization to an outer region of the fibers such that the length of time that is required to effectively stabilize the fibers is substantially reduced, resulting in a substantial reduction in the cost of manufacture of the BRPF. By "effectively stabilized" is meant that the fiber has the characteristics of a fully stabilized fiber and can be exposed to the higher temperatures employed in the carbonization step.

Correspondingly, in the process of the invention, it is now no longer necessary to completely carbonize the BRPFs but that the time of carbonization can be reduced by carbonizing at least a portion of each fiber which has been oxidatively stabilized, thereby reducing the time and energy requirements for the manufacture of the BRFs while improving key performance characteristics of the fiber, particularly its flexibility, elongatability, and shear sensitivity. It is not essential that carbonization be carried out to the extent where it is exactly coincident with the extent of stabilization. In other words, carbonization of the BRPF can be somewhat less than the extent of the stabilized outer region or can be somewhat greater than the extent of the stabilized outer region. In the latter case, it has been found that carbonization of the non-stabilized thermoplastic inner core region does not result in a runaway exothermic reaction and does not, in any way affect the integrity of the finished fiber.

It is therefor a particular object of the invention to provide a flexible ignition resistant BRF preferably derived from a precursor fiber made from a single homogeneous polymeric composition, with said BRF having an inner region of a thermoplastic polymeric core and a surrounding outer region of a thermoset carbonaceous sheath.

It is another object of the invention to provide a flexible BRPF derived from a homogeneous polymeric composition and in which the fiber has, in cross-section, an inner region of a thermoplastic polymeric core and an outer surrounding region of an oxidatively stabilized thermoplastic sheath.

It is another object of the invention to provide a process for the manufacture of an oxidation stabilized biregional precursor fiber by treating a fiber preferably made from a homogeneous polymeric composition in an oxidizing atmosphere and for a period of time and at a temperature sufficient to oxidize an outer region of the fiber to form an oxidation stabilized outer sheath, said fiber having an inner core region consisting of a non-oxidized thermoplastic material.

It is another object of the invention to provide a process for the manufacture of the BRF of the invention, by treating a fiber preferably made from a single homogeneous polymeric composition in an oxidizing atmosphere for a period of time and at a temperature sufficient to oxidize an outer region of the fiber to form an oxidation stabilized outer sheath, and then heating the oxidation stabilized precursor fiber in a non-oxidizing atmosphere at a temperature and for a period of time sufficient (greater than 10 seconds but less than 300 seconds) to carbonize the outer oxidation stabilized region of the fiber, said fiber having an inner region of a non-oxidized thermoplastic core and a surrounding outer region consisting of a thermoset carbonaceous sheath.

It is a further object of the invention to provide various assemblies from a miltiplicity of the novel fibers of the invention, i.e. BRPF or BRF, or mixtures thereof, said assemblies including tows, non-woven assemblies such as, for example, a wool like fluff, a batting, web, felt, and the like, blends of the biregional fibers with other natural or polymeric fibers, a compression formed or densified sheet or panel of the biregional fibers, usually containing a small percentage of less than 10% of a polymeric binder, especially binder fibers, or knitted or woven fabric, and the like. In any of these assemblies or structures, the BROF or BRF can be linear or crimped, or a mixture thereof.

It is also an object of the invention to provide a multiplicity of crimped biregional fibers of the invention in the form of a wool like fluff or batting with substantial loft for use as a flame resistant thermal insulation for buildings, such as residential, office, or public buildings, etc. Although these thermal insulation fibers are preferably biregional fibers, they can also be BRPF or a mixture of the BRF and the BRPF. Depending on the degree of carbonization of the sheath of the BRFs, i.e. electrically non-conductive, semi-conductive, or conductive, the fibers can also be used for various other purposes such as an antistat or electromagnetic shielding material; as a flame resistant thermal insulation and sound absorbing material in aircraft, or as a fire blocking panel in vehicles such as automobiles, aircraft, ships, etc. Biregional fibers that are graphitized and highly electrically conductive (BRF-B) are especially well adapted as electrodes in secondary energy storage devices.

It is another object of the present invention to blend the fibers of the invention with other natural or polymeric fibers. These fibers are particularly useful in the preparation of yarn for the manufacture of textiles. Linear, or non linear or crimped BRPFs or BRFs, when blended with other natural or synthetic fibers, are useful in the form of a wool like fluff that can be used in clothing articles such as, for example, jackets, blankets or sleeping bags.

In another object of the invention, the BRFs or BRPFs can be employed as a reinforcement material in a polymeric matrix, forming a fiber reinforced composite. The fibers can be linear, non-linear, or a mixture of the linear and non-linear fibers and can be applied to at least one surface of the polymeric matrix or dispersed throughout the polymeric matrix. When the BRFs are applied to the surface of a polymeric panel such as, for example, a panel formed from a polystyrene polymer, as little as about 10% by weight of the fibers, based on the total weight of the panel, provide the panel with fire resistance. When the BRFs are distributed throughout the polymeric panel, in an amount of up to 95% by weight, the fibers provide a composite having improved fire resistance, as well as vibration and impact resistance and adhesion.

It is a particular object of the invention to provide terminal and/or bipolar electrodes for secondary energy storage devices, such as batteries, including lithium ion cells, employing the novel biregional fibers of the invention. The invention further relates to several different types of batteries employing at least one of said electrodes and to a lithium ion battery utilizing a pseudo bipolar electrode employing the novel biregional fibers of the invention having a portion thereof coated with a lithium salt of a metal oxide.

It is a further aspect of the invention, to provide the biregional fiber of the invention with a conformal silicone coating in order to enhance the fire resistant characteristics of the fiber.

It is also an aspect of the invention, to provide an assembly from a multiplicity of the biregional fibers of the invention and to coat the assembly with a hydrophobic material coating in order to render the assembly buoyant.

It is a further object of the invention to employ a multiplicity of the biregional fibers of the invention in the form of a batting, webbing, or the like, as an electromagnetic shielding material. Optionally, the shielding material can be incorporated into a polymeric matrix to form a panel.

Further objects of the invention, not specifically recited herein above, will become apparent from a reading of the detailed description of the invention.

DETAILED DESCRIPTION OF THE INVENTION

Figure 1:
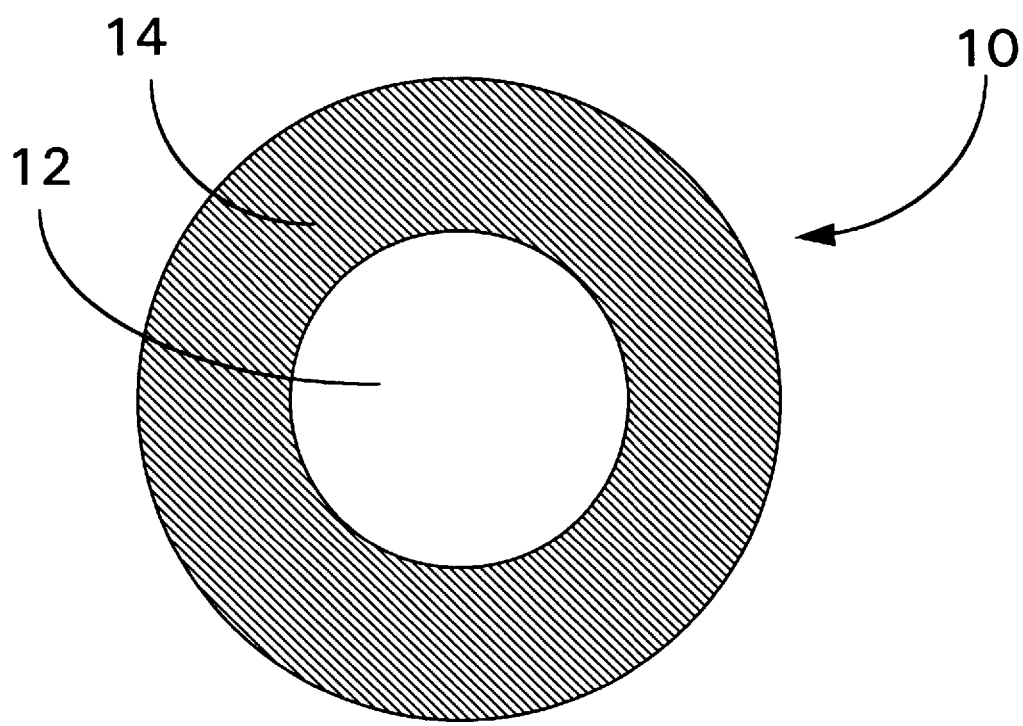
FIG. 1 is a generally circular in cross section, ignition resistant biregional fiber of the invention.

In the manufacture of carbonaceous fibers, stabilization of polymeric fibers is generally conducted in an oxidizing atmosphere and under tension at a moderately elevated temperature of, typically, from 150° C. up to 350° C. for PAN (polyacrylonitrile) fibers and for a period of time sufficient to achieve complete permeation of oxygen throughout the fiber, and then heat treating the "Oxidized PAN Fiber" (OPF) in a non-oxidizing atmosphere, usually under tension, at a temperature above 750° C. to produce a fiber that is carbonized throughout a cross section of the fiber, i.e. throughout the fiber material. Fibers that are treated at a temperature above 1500° C. typically have a carbon content of greater than 92% and are characterized as carbon or graphitic fibers having a high tensile strength. Stabilizaton of the fibers involves (1) an oxidation cross-linking reaction of adjoining molecular chains as well as (2) a cyclization reaction of pendant nitrate groups to a condensed heterocyclic structure. The reaction mechanism is complex and not readily explainable. It is believed, however, that these two reactions occur concurrently and may be competing. The cyclization reaction is exothermic in nature and must be controlled if the fibrous nature of the acrylic polymer undergoing stabilization is to be preserved.

Because the reactions are highly exothermic in nature, the total amount of heat released is so great that temperature control is difficult. Care must be taken to avoid processing too large a number of fibers in close proximity, which would cause localized heat buildup and impede heat transfer to the atmosphere around the fibers in the fiber assembly (e.g. a fiber tow or a woven or knitted cloth). In fact, the oxidation stabilization of acrylic fibers has a considerable potential for a runaway reaction. Furthermore, some trace of hydrogen cyanide is evolved during this step and the content of this component in the atmosphere of the oven must be prevented from getting into the explosive range by injecting nitrogen, as required. Accordingly, prior art techniques overcome this problem by heating the fibers at a moderate temperature and at a controlled oxygen content over many hours. Control of the oxygen containing atmosphere, e.g. air, can be achieved by diluting the air with nitrogen.

Since thermal stabilization has tended to be unduly time consuming and capital intensive, various other approaches have also been proposed to expedite the desired reaction, e.g., through the use of stabilization promoting agents and/or chemical modification of the acrylic fiber before it can be pyrolized. However, these approaches have also added to the cost of manufacture and further lengthened the time of processing the fibers.

It has now been discovered that the extent of oxidation stabilization of a polymeric fiber such as, for example, an acrylic fiber can be substantially reduced by oxidizing only an outer portion or region (when viewed in cross section) of the fiber while the inner portion or core of the fiber remains in a thermoplastic and non-stabilized condition. Achieving stabilization of only an outer region of a fiber can therefor be conducted over a much short period of time, depending on the desired thickness of the stabilized outer fiber sheath. Typically, the ratio of the radius of the core with respect to the total radius of the fiber is from 1:4 to 1:1.05, preferably from 1:3 to 1:1.12. At a ratio of 1:4, it can be calculated that the percentage volume that is represented by the core is about 6% by volume, leaving about 94% for the outer sheath. At a ratio of 1:1.05 the percentage volume that is represented by the core is about 91%, leaving about 9% for the outer sheath. It is generally preferred to keep the ratio at a value where the volume of the outer sheath is relatively small, preferably less than 25%, which represents a ratio of 1:1.12 to less than 1:1.15 in order to keep the time of oxidation or carbonization treatment at a minimum without detrimentally affecting the intended commercial performance of the fiber.

It will be understood that the ratio can be adjusted to any value, depending upon the end use or physical characteristics desired for the biregional fiber of the invention. For example, a ratio of from 1:1.12 to 1:1.16 would be entirely satisfactory for use of a multiplicity of the biregional fibers as thermal insulation for building structures, while a ratio of 1:2 to as high as 1:3 would be sufficient for ignition resistant biregional fibers or when used as an electrode for secondary electrical storage devices.

The BRPFs are heat treated in an inert atmosphere and for a period of time sufficient to form an outer region of a thermoset carbonaceous sheath which, preferably, is of substantially the same thickness as the stabilized outer sheath of the fiber. It will be understood, however, that the processing conditions are difficult to control and maintain to an absolute exact degree such that there is a precise coincidence of carbonization of the oxidation stabilized region only of the fiber. It has now been discovered that this is not critical and that an exact coincidence of the regions is not absolutely essential. In other words, the oxidation stabilized region can be carbonized to the extent that carbonization extends into the thermoplastic core region, without detriment to the inner core of the fiber or the fiber per se.

It has also been surprisingly discovered that the oxidation stabilization of polymeric fibers can be controlled, i.e. stopped at any point, to produce two regions that are visually and physically distinct from each other and that these BRPFs are capable of surviving the subsequent carbonization treatment. It is presently taught in the prior art that oxidation stabilization has to be carried out to the extent until the entire fiber material is sufficiently oxidized to stabilize the fiber for subsequent carbonization of the fibers since the thermoplastic polymeric material portion of a partially oxidized fiber is believed to be highly reactive at temperatures above 200° C. (see High Performance Fibers II, page 151). The expectation by persons skilled in the arts is that carbonaceous fibers can not be produced without a complete stabilization of the fibers prior to their treatment at a higher temperature and in a non-oxidizing atmosphere to achieve carbonization. It is therefore surprising that stabilization and, correspondingly, carbonization of the fibers need not completely include the entire fiber material but that such partial treatment can be carried out without any detriment to the carrying out of the process per se or to the overall performance of the resulting fibers for their intended purpose.

The following Table demonstrates the typical physical characteristics for various types of fibers including the fibers (BRF and BRPF) of the invention:

TABLE I

| Material* | $\rho$ (g/cc) | SR (Ohm-cm) | YM (psi) | Elongation (%) | Strength | TP/TS | Shear Sen. |
|---|---|---|---|---|---|---|---|
| PAN/SAF | 1.15–1.19 | $>10^8$ | low | 8–10 | low | tp | ns |
| OPF | 1.33–1.44 | $>10^8$ | low | 20–30 | low | tp–ts | ns |
| BRPF | 1.20–1.32 | $>10^8$ | low | 15–25 | low | tp–ts | ns |
| CPF 1 | 1.50–1.60 | $10^8$–$10^2$ | 1 MM | 3–9 | low | ts | ss |
| CPF 2 | 1.60–1.70 | $10^2$–$10^{-1}$ | 2–3 MM | 3–6 | low | ts | vss |
| CPF 3 | 1.70–1.95 | $<10^{-1}$ | 3–20 MM | 2–4% | medium | ts | ess |
| BRF 1 | 1.45–1.60 | $10^8$–$10^2$ | <1 MM | 4–12 | low | ts | ns |
| BRF 2 | 1.50–1.70 | $10^3$–$10^0$ | 1–2 MM | 3–9 | low | ts | slight ss |
| BRF 3 | 1.65–1.85 | $<10^0$ | 2–18 MM | 3–7% | medium | ts | slight ss |
| BRF-B | 1.70–1.87 | $<10^{-2}$ | 3–30 MM | 2–5% | high | ts | ss |

Legend

PAN/SAF — Polycrylonitrile/Special Acrylic Fiber
OPF — Oxidized Pan Fiber
BRPF — Biregional Precursor Fiber
CPF — Carbonized PAN Fiber
CPF 1 — noncond. carbonaceous fiber
CPF 2 — antistat carbonaceous fiber
CPF 3 — conductive carbonaceous fiber
BRF — Biregional Fiber
BRF- Biregional Battery Electrode Fiber TABLE I-continued

| Material* | ρ (g/cc) | SR (Ohm-cm) | YM (psi) | Elongation (%) | Strength | TP/TS | Shear Sen. |
|---|---|---|---|---|---|---|---|

Shear Sensitiviiy

| | |
|---|---|
| ns | non sensitive |
| ss | sensitive |
| vss | very sensitive, brittle |
| ess | extremely sensitive, v. brittle |

*All BR fibers can be linear or crimped
TP/TS — Thermoplastic/Thermoset Char.
YM = Young's Modulus
g/cc — grams per cubic cm.

From the Table, it can be concluded, for example, that the biregional fibers of the invention can be broadly classified into three groups depending upon their particular use and the environment in which they are placed.

In a first group (BRF-1), the biregional precursor fiber (BRPF) can be carbonized to an extent where the carbonaceous outer sheath of the fiber is partially carbonized and has a carbon content of greater than 68% but less than 85% by weight, is electrically non-conductive and does not possess any electrostatic dissipating characteristics. A fibrous assembly made from a multiplicity of such fibers is light weight, non-flammable, and has excellent washability and can be used in, for example, personal clothing articles such as jackets, blankets, sleeping bags, or the like. The biregional fibers can also be made into a batting or webbing, for example, that can be blended with other synthetic or natural fibers including cotton, wool, polyester, polyolefin, nylon, rayon, etc. Blended fibers or yam are non-flammable and are excellent for use in fabrics, carpeting, etc. It should be noted that the BRPF, is useful as a commercial product and can be used for any of the end uses indicated herein above. When the BRPFs are employed as a thermal insulating material, for example, they also perform the function of a fire retarding medium since an outbreak of a fire will convert the oxidation stabilized outer region of the fiber into a carbonaceous region, while oxygen is prevented from contacting the thermoplastic polymeric inner core region of the fiber due to thermal shielding by the stabilized outer region.

The term electrically non-conductive, as utilized in the present invention, relates to a fiber which has a bulk resistivity of from $10^2$ to $10^8$ ohm-cm. When the BRF-1 is derived from an acrylic fiber it has been found that a nitrogen content of the carbonaceous outer sheath of 22% by weight or higher results in an electrically non-conductive fiber. BRF-1 of this group typically has a density of from 1.45 to 1.60 g/cm$^3$, a Young's modulus of less than 1 MM psi, an elongatability to break of from 4% to 12%, and a breaking twist angle of from 9 to 13 degrees. The fiber is not measurably shear sensitive and can be readily processed on standard textile equipment including shear intensive processing operations such as drafting operations. When these fibers are subjected to a twisting angle of about 9 degrees, the outer sheath will shear but the inner core will remain in tact and therefore the fiber will not suffer breakage. At a twisting angle of greater than 9 to 13 degrees, the fibers will actually break. This is in marked contrast to fully carbonized or graphitic fibers of the present state of the art which will break when subjected to twist angles of greater than 3 degrees.

In a second group (BRF-2), the fiber can be carbonized to an extent where the outer carbonaceous sheath of the fiber has some electrical conductivity, i.e. the fiber is partially electrically conductive and has electrostatic dissipating characteristics. The carbonaceous outer sheath has a carbon content of greater than 68% but less than 85% by weight.

Low conductivity means that the fiber has a bulk resistivity of from $10^3$ to $10^0$ ohm-cm. Fibers of this group typically have a density of from 1.50 to 1.65 g/cm$^3$, a Young's modulus of from 1 to 2 MM psi (6.9 to 13.8 GPa), an elongatability to break of from 3% to 9%, and a breaking twist angle of from 8 to 10 degrees. This ignition resistant biregional fiber has a slight sensitivity to shear but compares favorably with fibers that are fully carbonized or graphitized and that are typically very shear sensitive and will break when subjected to twist angles of greater than 2 degrees.

A fibrous assembly made from a multiplicity of BRF-2 is non-flammable and is excellent for use, for example, as insulation for aerospace vehicles or as insulation in areas where public safety is a concern. The assembly formed from a multiplicity of BRF-2 is lightweight, has low moisture absorbency, good abrasion resistance together with good appearance and hand.

In a third group (BRF-3) the fibers are processed to an extent where the carbonaceous outer sheath of the fiber is electrically conductive and has a carbon content of at least 85% but less than 92% by weight and a nitrogen content of greater than 5% by weight. BRF-3 is characterized as having a high electrical conductivity, that is, the fibers have a bulk resistivity of less than $10^0$ ohm-cm. Fibers of this group typically have a density of from 1.65 to 1.85 g/cm$^3$, a Young's modulus of from 2 to 18 MM psi (13.8 to 124.2 GPa), an elongatability to break of from 3% to 7%. The fibers have a slight shear sensitivity and can withstand a breaking twist angle of from 7 to 9 degrees without breaking which is a substantial improvement compared with fully carbonized fibers which typically are extremely shear sensitive and have an breaking twist angle, α, of from 1 to 2 degrees. A batting made from a multiplicity of such fibers, as a result of their higher carbon content, has superior thermal insulating and sound absorbing characteristics. Such a batting also has good compressibility and resiliency while maintaining improved thermal insulating efficiency. The batting finds particular utility in the insulation of furnaces and areas of high heat and noise.

The following Table II demonstrates the typical breaking-twist angles in degrees for various types of fibers including the fibers of the invention:

TABLE II

| Fiber Material | Breaking twist angle α (degrees) | Reference* |
|---|---|---|
| Polyester | 42–50 | H |
| Acrylic | 33–34.5 | H |
| Glass | 2.5–5 | H |
| Celbond ™ sheath-core polyester binder fiber 20μ | 26 | E |
| OPF (Fully stabilized Oxidized PAN Fiber) | 15–17 | E |
| Carbon/Graphite Fiber | 1–2 | E |

TABLE II-continued

| Fiber Material | Breaking twist angle α (degrees) | Reference* |
|---|---|---|
| BRPF | 17–23 | E |
| BRF-1 | 9–13 | E |
| BRF-2 | 8–10 | E |
| BRF-3 & BRF-B | 7–9 and 4–8 | E |
| CPF-2 (antistat carbonaceous fiber) | 2–3 | E |

*Reference Source: "H", Physical Properties of Textile Fibers by W. E. Morton and J. W. S. Hearle. The Textile Institute, Manchester, England (1975), p. 425; "E" Experimentally measured following the procedure described by Morton & Hearle on p. 421–425 at 65% r.h., 1 cm lengths, tensile stress of 10 N/m² and 240 turns per minute.

In a fourth group (BRF-B), the fiber can be carbonized to an extent where the carbonaceous outer sheath of the fiber is highly electrically conductive and has a carbon content of greater than 92% to as high as 99% by weight. Broad categories of the conventional fibers falling into this group are disclosed in "Encyclopedia", in supra, p.641, and are generally defined as "high strength" and "high modulus" fibers in which the treatment temperatures range from 1000° to 2500° C. BRF-B with a carbon content of greater than 92% in the outer sheath is characterized as having a bulk resistivity of less than $10^{-2}$ ohm-cm. Fibers of this group typically have a density of from about 1.70 to 1.87 g/cm³, a Young's modulus of less than 1 MM psi (<6.9 Gpa) to 30 MM psi (207 GPa) but can be as high as 50 MM psi (345 GPa), depending upon the degree of carbonization, i.e. carbon content and thickness of the graphitic outer sheath region. These fibers have an elongatability to break of from 2% to 5% and are somewhat shear sensitive although they still compare very favorably with conventional carbon or graphite fibers which typically are extremely shear sensitive. The fibers are particularly suitable for use in electrodes for secondary storage devices, esp. batteries. The fibers can withstand a breaking twist angle of from 4 to 8 degrees without breaking which is a substantial improvement compared with fully carbonized and graphitized fibers of the present state of the art which are extremely shear sensitive and typically have an breaking twist angle, α, of from 1 to 2 degrees.

It will be understood that the Young's modulus for any of the above described ignition resistant biregional fibers can be somewhat higher than indicated since the Young's modulus is, to a great extent, dependent on the degree of carbonization of the outer sheath and the depth of carbonization of the fiber per se, i.e. the radial thickness of the carbonized outer region of the fiber.

Polymeric materials that can be suitably used herein to make the fibers of the invention include any of the well known polymers that are capable of being stabilized and carbonized to form the fibers. Exemplifications of such polymeric materials are copolymers and terpolymers of polyacetylene, polyphenylene, and polyvinylidene chloride. Other well known polymeric materials include aromatic polyamides (Kevlar™), polybenzimide resin, Saran™, and the like. Mesophase pitch (petroleum or coal tar) containing particulate impurities or additives can also suitably be employed. Preferably, the polymeric composition for the manufacture of the fibers of the invention is an acrylic or a sub-acrylic polymer (as hereinafter defined).

It is known in the art and an accepted standard, imposed by the Federal Trade Commission, that the term "acrylic" applies to any long chain synthetic polymers composed of at least 85 mole percent by weight of acrylonitrile units and less than 15 mole percent of another polymer. Fibers made from these acrylic compositions are usually wet spun and are limited to fibers having a circular cross-section. Acrylic polymers which are the materials of choice in preparing the fibers of the invention are selected from one or more of the following: acrylonitrile based homopolymers, acrylonitrile based copolymers and acrylonitrile based terpolymers. The copolymers typically contain at least about 85 mole percent of acrylonitrile units and up to 15 mole percent of one or more monovinyl units that are copolymerizable with acrylonitrile including, for example, methacrylic acid esters and acrylic acid esters such as methyl methacrylate, ethyl methacrylate, propyl methacrylate, butyl methacrylate, methyl acrylate and ethyl acrylate; vinyl esters such as vinyl acetate and vinyl propionate; acrylic acid, methacrylic acid, maleic acid, itaconic acid and the salts thereof; vinylsulfonic acid and the salts thereof.

In accordance with a further embodiment of the invention, it is preferred to make the fibers of the invention from a sub-acrylic polymer as described in copending European application Ser. No. 95202056.8, filed 27 Jul. 1995, in the name of F. P. McCullough, which consists of a long chain polymer selected from the group consisting of copolymers and terpolymers containing less than 85 mole percent acrylic units but more than 15 mole percent of the above mentioned monovinyl units, copolymerized therewith. The amount of monovinyl units that can be present in a sub-acrylic polymer is preferably from greater than 15% to 25% by weight. However, as much as 35 mole percent of the monovinyl units can be blended with the acrylic units to render the blend more easily melt extrudable through an extrusion nozzle or nozzles while the polymer blend is in a heat softened condition. The so extruded, heat softened filament can be stretched and attenuated, while under tension, to form a finer denier filament (i.e. in which the unit length of the fiber is increased with respect to the weight) having a relatively smaller diameter as compared to extruded fibers made from a standard acrylic resin. The sub-acrylic polymer of the invention can preferably be employed in extruding a filament having a noncircular cross-section.

A plasticizer can be added to or blended with a high polymer to facilitate processing and to increase the flexibility and toughness of the final product by internal modification (salvation) of the polymer molecule. Suitable plasticizers can be any organic compound including, for example, vinyl chloride, methyl acrylate, methyl methacrylate, polyvinyl chloride and cellulose esters, phthalates, adipates, and sebacate esters, polyols such as ethylene glycol and its derivatives, tricresyl phosphate, caster oil, etc.

The physical shape of the polymeric fiber that can be suitably employed in the production of the oxidation stabilized or carbonized ignition resistant biregional fibers of the invention can be of the usual generally circular in cross section fiber, having an aspect ratio of greater than 100:1.

Preferably, the fibers of the invention have a non-circular cross sectional shape as described in Modern Textiles, second edition, 1982, by D. S. Lyle, John Wiley & Sons. In the chapter entitled "Fiber Properties", pp. 41 to 63, various natural and polymeric fibers are described having different surface contours, i.e. smooth, rough, serrated, etc. which are said to influence cohesiveness, resiliency, loft, and thickness. Polymeric fibers having various non-circular cross-sectional shapes are described in Table 2–9 on pages 52 and 53 and include tubular, triangular, irregular, striated, oval, etc. Reference to non-circular in cross section fibers and their use in electrodes is also made to copending U.S. patent application Ser. No. 081372,446, filed Jan. 13, 1995 in the name of Francis P. McCullough. The non-circular in cross section fibers of the invention preferably are multi-lobal, e.g. trilobal or pentalobal, in cross-section.

The fibers of the invention can be made more easily and at a substantially lower manufacturing cost from an unfiltered polymeric composition such as, for example, an acrylic or sub-acrylic polymer that can contain from 0.0001 to 5% by weight particulate matter in which the individual particles have a diameter of less than 0.1 microns, preferably less than 0.001 microns. Sub-micron particles are naturally present in any polymeric composition and thus will also be present in polymeric compositions that are extruded to form fibers for use in the manufacture of textile articles, for example. These particles are generally organic or inorganic materials which are insoluble in the polymeric melt or dope. The term "unfiltered" used herein applies to polymeric compositions which, when in a melt phase and during manufacture, are not subjected to the usual micro-filtration procedure to remove impurities, such as non-polymeric inclusions, from the polymeric compositions.

It is also contemplated and within the scope of the invention to introduce an additional quantity of sub-micron particulate matter, such as, for example, fumed silica, calcium oxide and various other inorganic materials such as silicates into the polymeric composition. It has been found that the addition of from 0.01 to 2%, preferably from 0.1 to 1% of these sub-micron particles into the polymeric composition will reduce the formation of a high degree of order or crystallinity in the polymeric composition of the spun fiber. When the BRPF is subsequently heated and carbonized in a non-oxidizing atmosphere, it lacks the stiffness, brittleness and high modulus that is normally associated with traditional carbon or graphitic fibers, while still exhibiting a low electrical resistivity and good uniform and contiguous surface structure, free from the voids, pores and pitting normally associated with adsorptive carbon materials. These characteristics differentiate the BRFs of the invention from high surface area absorptive carbon materials.

The fibers of the invention are essentially continuous, i.e. they can be made to any desired length, they can be essentially linear or nonlinear (i.e. nonlinear being crimped in a conventional manner in an air jet, stuffer box or gear crimping mechanism), and possess a high degree of flexibility which manifests itself in a fiber which has a much greater ability to withstand shear, which is not brittle, and which has a bending strain value of from greater than 0.01 to less than 50%, preferably from 0.1 to 30%. These properties allow the fibers of the invention to be formed into a variety of assemblies or configurations for use in many different types of applications, such as battings, webs, etc. In contrast, the bending strain value of a conventional carbon or graphitic fiber, for example, with a high modulus is substantially less than 0.01% and often less than 0.001%. Moreover, the non-circular cross-sectional shape of a multiplicity of non-linear fibers of the invention is particularly advantageous, e.g. especially in battings, since they are capable of forming a highly intertwined fibrous structure having a higher thermal R value at a given density compared to a batting containing fibers having a substantially round cross sectional shape. This is due mainly to surface interactions between the fibers and some enhanced Knudsen effects. In blended yarns, the non-circular cross section of the fibers of the invention also exhibit greater flexibility and deflective recovery without breakage as compared to a conventional round cross-sectional fiber, principally due to the smaller apparent diameter of the non-circular shape of the fiber. Although the fibers of the invention can have a diameter of as large as 30 microns, it is preferred to form the fibers of a relatively small diameter of from 2 to 15 microns, preferably from 4 to 8 microns, since the diameter of the fiber is generally proportional to its surface area. Specifically, two fibers of a generally round or circular cross section and having a diameter of 5 microns will present about 4 times the surface area of a single fiber having a diameter of 10 microns.

Where the BRF is intended for use as an electrode for a secondary energy storage device, the outer carbonized sheath of the fiber preferably has a surface area of from greater than 1 to 150 $m^2/g$, preferably greater than 5 $m^2/g$, and more preferably from 10 to 50 $m^2/g$, so long as the method employed to increase the surface area preserves the surface structural integrity of the fiber. The surface area of the non-circular fiber is substantially higher compared to a circular fiber taught in the prior art that generally prefer a surface area that is less than one would associate with activated absorptive carbon (which has a surface area of from 50 to 2000 $m^2/g$). Activated absorptive carbon is known to have a very porous and pitted surface and one that is not essentially contiguous, i.e. without pits and pores. The reason for the use of BRFs of the invention having a contiguous surface and yet one that has a relatively high surface area lies in the fact that the cross-sectional geometry is changed from the typical generally circular cross-section of the prior art to the hereinbefore described non-circular cross-section which increases the surface area of the fiber for a given diameter while preserving the surface structural integrity characteristics.

With particular reference to FIG. 1, there is illustrated an ignition resistant biregional fiber of the invention having a generally circular cross-sectional shape. The fiber is generally identified by reference number 10 and comprises an inner core region 12 of a thermoplastic polymer and a surrounding outer region of a thermoplastic stabilized sheath or a thermoset carbonaceous sheath. The fiber has a nominal cross-sectional diameter, when bisected, which is the linear distance from any one point along the outer surface of the fiber through the center of the fiber to an opposite point on its outer surface. Accordingly, the nominal diameter of a circular fiber is also its "effective" diameter. The BRPF of the invention would have essentially the same configuration except that the outer region of the fiber would be oxidation stabilized.

Figure 2:
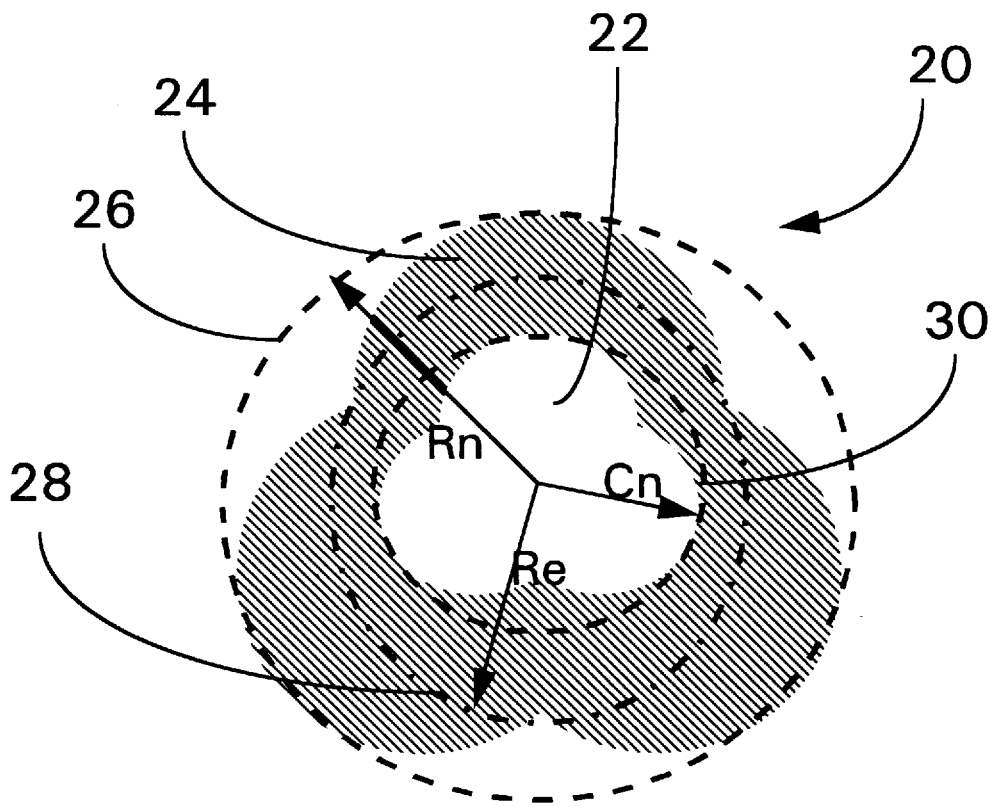
FIG. 2 is a cross sectional view of a preferred trilobal in cross section, ignition resistant biregional fiber of the invention.

With reference to FIG. 2, there is illustrated a fiber, generally identified by reference number 20, having a generally tri-lobal cross-sectional shape which presents an enlarged surface area for a given outer nominal fiber diameter, as compared to the circular fiber of FIG. 1. The fiber has an inner core region 22 of a thermoplastic polymer and an outer oxidation stabilized or thermoset carbonaceous sheath represented by the shaded region 24. In the tri-lobal cross-sectional fiber, the outer nominal fiber radius is identified by the arrow Rn pointing to the outermost dotted line 26 encircling the fiber and extending generally tangential along the outer extent of the lobes of the sheath. The effective radius of the fiber is shown by the arrow Re pointing to the dotted line 28 which intersects the valleys of the tri-lobal fiber. The nominal radius of the core is identified by the arrow Cn pointing to the dotted line 30 which generally extends tangentially along the outer extent of the lobes of the core 22. Thus, in the case of a tri-lobal fiber the nominal diameter is equivalent to the nominal diameter of a generally circular cross-sectional fiber, but its effective diameter Re is substantially smaller as represented by the dotted line circle 28. Not only does the smaller effective diameter of the tri-lobal fiber provide the fiber with greater flexibility, but such flexibility is enhanced by the fact that the effective radius of the core is smaller than the nominal radius of the core and, in addition, the fact that the core is of a thermoplastic polymeric material having inherently greater flexibility as compared to a stabilized fiber which has been carbonized throughout its cross section. The enhanced flexibility of the ignition resistant biregional fiber is represented by a substantially reduced sensitivity of the fiber to shear although, as previously indicated, the shear sensitivity of the fiber is influenced to a major extent by the ratio (r:R) and its bulk density, i.e. the shear sensitivity increases with an increase in the thickness of the outer carbonaceous sheath and its degree of carbonization or graphitization. The bending strain value of the fiber is generally less than 50% which is highly advantageous in forming relatively sharp bends in the fiber without breakage of the fiber. Here again, the bending strain value is further enhanced by the fact that the fiber is non-circular and biregional in construction.

Optionally, the fibers of the invention can also be in the shape of a hollow or generally tubular fiber or can be provided with one ore more central passageways extending along the length of the fiber core. These types of fibers represents a saving in the amount of polymeric composition used without any sacrifice in performance. Additionally, the interior passageway(s) renders the fiber even more flexible. It will be understood that a tubular cross section fiber would present concentric regions of a thermoset or carbonaceous outer region and a thermoplastic inner ring core.

The trilobal in cross-sectional fiber configuration illustrated herein is representative of only one type of cross-sectional configuration and it will be apparent to the artisan that the fiber can be made in any desired cross-sectional shape during its manufacture and that such shape is limited only by limitations of making an extrusion die for extrusion of a polymeric composition through the die, the composition of the polymer, temperature, etc. The number of lobes of a fiber is limited only by the fact that the heat softened polymer that is extruded from a die has a tendency to flow and thereby obliterate the cross-sectional shape to revert to a more nearly circular cross-sectional shape. For other cross-sectional shapes of polymeric fibers, reference is made to "Modern Textiles" by D. S. Lyle, particularly pages 52 and 53.

Preferably, the biregional fiber of the invention should have the following physical property criteria:

(1) A ratio (r:R) of the radius of the core region (r) with respect to the total radius of the fiber (R) of from 1:4 to 1:1.05, preferably from 1:3 to 1:1.12. This ratio is applicable, of course, to BRPF as well as to BRF. The ratio of core volume to total volume of BRF has a substantial effect on the performance properties. Therefore, if ignition resistance is desired, then a ratio (r:R) of from 1:1.05 to 1:1.2 gives acceptable performance, whereas for fireblocking performance a ratio of 1:1.12 to 1:1.4 is desirable.

(2) A density of from 1.20 to 1.32 $g/cm^3$ for the BRPF, preferably from 1.24 to 1.28 $g/cm^3$. It should be understood, however, that the density of the fiber is dependent upon the ratio (r:R) of the radius of the core (r) with respect to the diameter of the fiber (R). If, for example, the ratio is 1:1.05 where the oxidized sheath occupies a very small portion of the volume of the fiber, the density of the fiber approaches that of a polymeric fiber. In the case where the polymeric fiber is derived from an acrylic polymer, the density is typically from 1.15 to 1.19 $g/cm^3$ so that the density of the BRF with a ratio of 1:1.05 is slightly higher.

(3) A density of from 1.45 $g/cm^3$ to 1.85 $g/cm^3$ for BRF. Typical densities range from 1.45 to 1.60 $g/cm^3$ for fibers in which the carbonaceous outer sheath is electrically non-conductive, i.e. BRF-1; from 1.50 to 1.70 $g/cm^3$ in which the carbonaceous sheath has electrostatic dissipating characteristics, BRF-2; from 1.65 to 1.85 $g/cm^3$ in which the carbonaceous sheath is electrically conductive, BRF-3, and up to about 1.87 $g/cm^3$ in which the outer sheath of the ignition resistant biregional fiber which is graphitic and highly conductive, i.e. BRF-B.

Typically, the densities of BRF can be somewhat higher than indicated above if, for example, the polymeric composition that is used for making the fibers is unfiltered and/or contain a high percentage of an added inorganic particulate material.

(4) A Young's modulus of from less than 1 MM psi (6.9 GPa), but greater than 0.3 MM psi (2.07 GPa), up to 50 MM psi (345 GPa), typically up to 30 MM psi (207 GPa). A modulus of up to 50 MM psi (345 GPa) being obtainable where the outer carbonaceous fiber sheath is predominant, i.e. at a ratio of about 1:4. (1 MM psi being equivalent to 1,000,000 psi).

(5) An aspect of greater than 100:1 (the aspect ratio is defined herein as the length to diameter 1/d ratio of the fiber), and a fiber diameter of from 1 to 30 microns (micrometers), preferably from 1 to 15 microns, and more preferably from 4 to 12 microns.

(6) A surface area with respect to BRF of greater than 1 $m^2/g$ and up to 150 $m^2/g$, preferably greater than 5 $m^2/g$ and, more preferably from 10 to 50 $m^2/g$. It will be understood that the carbonaceous surface area of the fiber can be as low as 0.1 $m^2/g$, but that such a low surface area will not provide the optimum in terms of the storage capacity or coulometric efficiency where the fiber is used as an electrode for a secondary storage device.

(7) The carbonized outer sheath of BRF should have a carbon content of typically from greater than 68% and up to about 99% by weight. The carbon content of the outer fiber sheath is somewhat dependent on the type of polymeric precursor composition that is used. Thus, if for example the polymeric precursor composition contains as much as 2% of an inert particular material, the maximum carbon content will be less than 98%.

(8) Specific resistivities for the fibers generally ranging from greater than $10^8$ ohm-cm for BRF that are electrically non-conductive, to less than $10^0$ ohm-cm for BRF-3 that are electrically conductive, and to less than $10^{-2}$ ohm-cm for BRF-B that are highly conductive, i.e. graphitic.

(9) A bending strain value of from greater than 0.01% to less than 50%, preferably from 0.1 to less than 30%.

(10) A breaking twist angle of from 17 to 23 degrees for BRPFs and from as low as 4 for BRF-B's to as high as 13 for BRF-1.

(11) In the case of graphitic fibers that are particularly useful for electrodes in secondary energy storage devices, it is preferred that the carbonaceous outer sheath of BRF-B has a contiguous surface that is substantially free of pits and pores and that has micropores representing less than 5% of the total surface area of the fiber.

Figure 3:
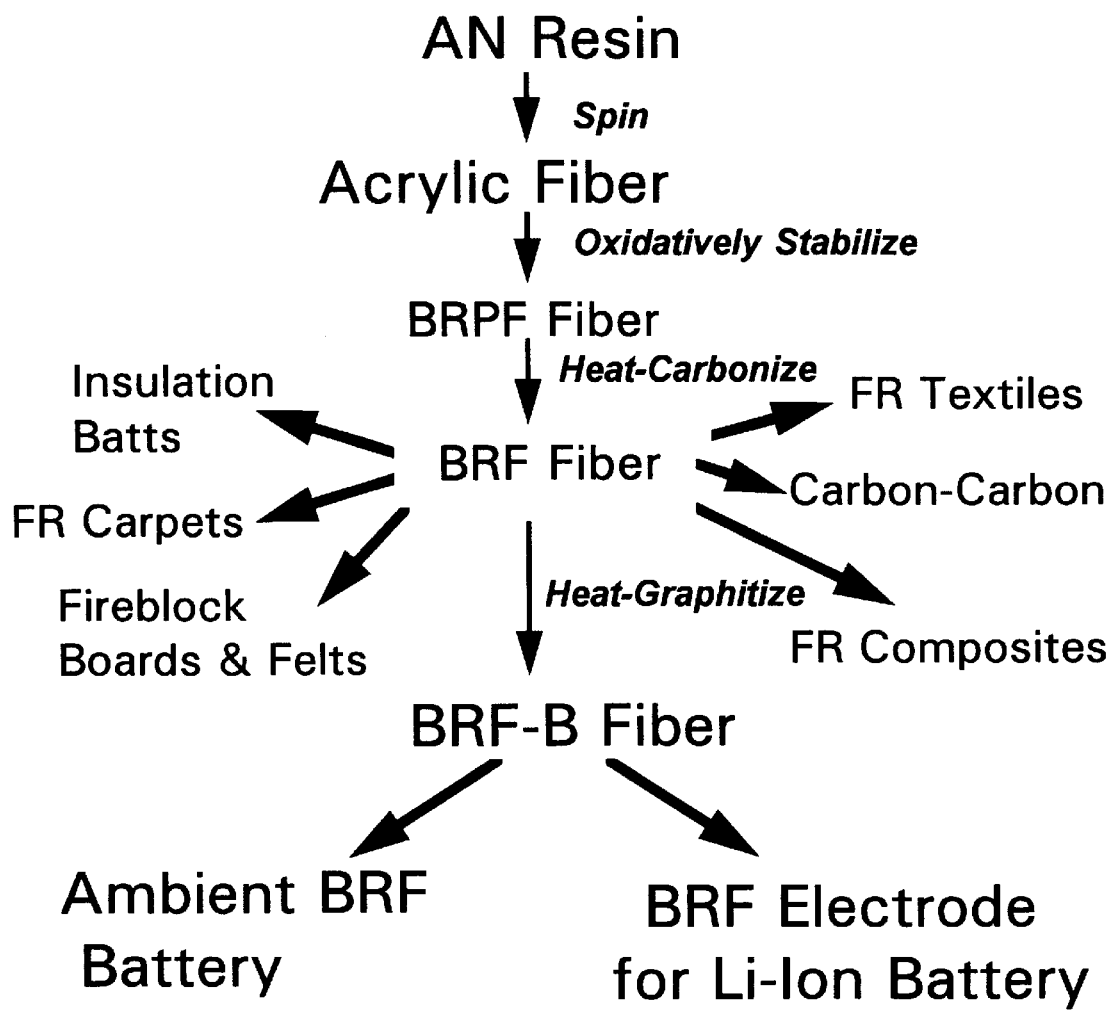
FIG. 3 is a schematic view of a flow chart of the process steps for the manufacture of the ignition resistant biregional fibers of the invention and various end uses for the novel ignition resistant biregional fiber.

With particular reference to FIG. 3, there is illustrated a flow chart that generally depicts a process for converting an acrylonitrile polymer into BRPFs and BRFs and their various end uses. The process conditions for spinning or coextruding polymeric fibers of the compositions disclosed in the present application are generally known in the art. It is preferred that the polymer be selected from a standard acrylic or a sub-acrylic polymer as disclosed herein and that the fibers are non-circular in cross section. The polymeric fiber is then oxidatively stabilized in a stabilization chamber at a temperature of from 150° to 300° C. in an oxidizing atmosphere. The time of oxidation for the fibers of the invention is, however, substantially reduced to less than 1 hour, preferably less than 30 min. The so produced biregional oxidation stabilized fiber (BRPF) will exhibit distinct visually discernible regions of a translucent or lightly colored inner core of a thermoplastic polymer and a black outer region of a thermoplastic oxidized sheath. An inspection of. an end of the fiber (in cross section) under a microscope failed to show a boundary or discontinuity between the inner core and the outer sheath regions. In effect, the surface of the fiber, when viewed in cross-section, was continuous from an outer surface to the center of the core.

The BRPF is then subjected to a carbonization treatment at a higher temperature and in a non-oxidizing atmosphere such as is generally taught in the art. Reference being made here to "High Performance Fibers" by Battelle. The time of carbonization for BRPF is, however, substantially reduced from as much as 30 min., as taught in U.S. Pat. No. 4,837,076, to less than 3 min., preferably from 45 sec. to 3 min., depending on various factors such as diameter of the fibers, etc. and on the degree of carbonization desired. Prior to carbonization, BRPF can be crimped and then conducted through the carbonization furnace while in a relaxed and unstressed condition so that the fibers will retain their crimped configuration. Here again, an inspection of an end of the fiber BRF under a microscope failed to show a boundary or discontinuity between the inner core and the outer carbonaceous sheath regions. In effect, the surface of the fiber, when bisected and viewed in cross-section, was continuous from an outer surface to the center of the core.

Ignition resistant biregional fibers having the physical properties of BRF-1 or BRF-2, as shown in Table I, can be converted into a wool like fluff or batting, for example, having high thermal insulation R values. These fibers can be employed as insulation for building structures, as stuffings for jackets or sleeping bags, and the like. BRF-2 can also be employed as electrostatic dissipating fibers for carpeting or for EMI shielding of sensitive electronic equipment, for example. Fibers having the properties of BRF-3 and that have an electrically conductive outer region can be suitably employed in fire retarding (FR) and sound dampening assemblies for use in various types of vehicles, such as aircraft, automobiles or ships.

Any of the BRF-1, -2 and -3 fibers can be made into various different assemblies such as blends in which the fibers are blended with other natural or polymeric fibers to form ignition resistant and fire retarding assemblies; composites in which the fibers are incorporated into a polymeric matrix to render the composites flame retarding and to increase the strength of the composite. BRF-3 when compression formed with a binding agent, are particularly suitable for use as a fire blocking sheet or panel. Any of these fibers or assemblies can also be provided with various coatings, including an organosilcone polymer that renders the fibers or assembly synergistically substantially more fire retarding, or a hydrophobic coating to render the assembly buoyant and or to reduce the water pickup.

BRF-B are particularly suitable for use in electrodes in secondary energy storage devices, such as ambient temperature, non-aqueous electrolyte batteries, or in an electrode, including bipolar electrodes, for use in lithium ion batteries. The various end use applications are more clearly illustrated in the flow chart of FIG. 3.

Preferred fibrous assemblies consisting of a multiplicity of the fibers of the invention can be in the form of randomly entangled fibers in the form of a wool-like fluff, a generally planar non-woven sheet, web or batting, a compression formed panel, a woven or knitted fabric, or the like. Exemplary of a preferred fibrous assembly is a generally planar sheet like article, such as a batting, made from a multiplicity of individual, non-linear (i.e. crimped) fibers of the invention. In a preferred method of fabrication of a batting a heavy tow of 320,000 (320K) polymeric fibers are employed. In the case of tows containing a smaller number of fibers, e.g. up to 40,000 fibers, the smaller tows can be fabricated into a knitted or woven cloth-like product. It is preferred to form the polymeric fibers, preferably in a stabilized condition, into the desired form (knit, woven, sheet or felt) prior to carbonization.

The non-linear BRF in the form of a non-woven web, felt or batting, and made from continuous or staple BRPF are particularly suitable for use as thermal insulation. These fibers are preferably non-conductive, have a density of from 1.45 to 1.60 g/cm$^3$, have a specific resistivity of from $10^8$ to $10^2$ ohm-cm, a Young's modulus of less than 1 MM psi (6.9 GPa), and an elongation to break of from 4 to 12%. These fibers are not shear sensitive when compared to fully carbonized, electrically non-conductive fibers of comparable density. Preferably, the non-linear BRF have a non-circular cross sectional shape to provide a batting with greater flexibility and loft, as well as greater thermal insulative characteristics with higher R values. The non-circular cross sectional shape of the fibers, especially in battings, produce higher thermal R values at given densities compared to battings containing round cross section fibers, mainly due to surface interactions and some enhanced Knudsen effects in the crevasses of the non-circular fibers.

Typical for the manufacture of thermal insulation assemblies from non-linear BRF, are the procedures described in U.S. Pat. No. 4,868,037 and U.S. Pat. No. 4,898,783 issued to F. P. McCullough et al,. The insulation assemblies utilizing the BRF are resilient, shape reforming, lightweight and non-flammable, have a low heat conductivity, high thermal insulative characteristics, washability, low moisture retention, high loft and volume retention, and high cohesiveness.

The present invention further contemplates the manufacture of fire retarding and fire blocking assemblies in a manner similar to the general procedures described in U.S. Pat. No. 4,879,168, issued Nov. 7, 1989 to F. P. McCullough et al. Various terms such as "fire resistant" used herein relate to any one of the characteristics of flame arresting, flame retarding, fire shielding and fire barrier.

An article is considered to be flame retarding to the extent that once an igniting flame has ceased to contact unburned parts of a textile article, the article has the inherent ability to resist further propagation of the flame along its unburned portion, thereby stopping the internal burning process. Recognized tests to determine whether a textile article is flame retarding are, inter alia, the American Association of Textile Chemists and Colorists Test Method 34-1966 and the National Bureau of Standards Test described in DOC FF 3-71.

An article is considered to be "fire shielding" if it is capable of deflecting flames and the radiation therefrom in a similar manner as aluminum coated protective garments, which are known in the art.

Fire barriers have the capability of being non-flammable, flame retarding and providing thermal insulation characteristics.

In accordance with the general teachings of U.S. Pat. No. 4,879,168, at least 7.5% by weight of a multiplicity of non-linear, resilient, shape reforming, BRF can be blended with natural or synthetic fibers to form a fire retarding blend. The resilient and shape reforming characteristics of BRF is, to some extent, dependent on the degree of carbonizaton and the ratio (r:R). For example, where the ratio indicates that the carbonaceous sheath represents a major portion of the fiber and that the degree of carbonization indicates that the outer sheath is graphitic and has a density of greater than 1.85 g/cm$^3$ and a bulk resistivity of less than $10^{-2}$ ohm-cm, the resiliency of the fiber is, relatively speaking, smaller than a fiber in which the carbonaceous outer sheath represents a minor portion or ratio (r:R) of the fiber and the degree of carbonization is low, i.e. where the outer sheath is electrically non-conductive.

The natural fibers can be selected from, for example, cotton, wool, flax, silk, or mixtures of one or more thereof with BRF of the invention. The polymeric fibers can be selected from, for example, cellulose, polyester, polyolefin, aramid, acrylic, fluoroplastic, polyvinyl alcohol and glass, or mixtures of one or more thereof with the ignition resistant biregional fibers of the invention. Preferably, the BRF are present in the blend in an amount of from 10% to 40%, are electrically non-conductive, antistatic or conductive, have a specific resistivity of from $10^8$ to less than $10^0$ ohm-cm, a density of from 1.45 to 1.85 g/cm$^3$, and an elongatability of from 3 to 12%. These BRF are not shear sensitive or, at most, are slightly shear sensitive, in comparison to fully carbonized fibers having a similar specific resistivity and which are shear sensitive. Greater amounts of the BRF in the blends improves the fire blocking and fire shielding characteristics of the blend. However, it is desirable to maintain a fiber characteristic close to the conventional blends so as to have a desirable aesthetic appearance and feel.

The present invention further contemplates the manufacture of fire retarding and fire shielding assemblies in a manner similar to the general procedures described in U.S. Pat. No. 4,980,233, issued Dec. 5, 1990 and U.S. Pat. No. 4,997,716, issued Mar. 5, 1991, both to F. P. McCullough et al,. According to such procedure for example, a panel or sheet formed from a polystyrene polymer, or a panel comprising a compression formed composite of a thermoplastic or thermosetting polymer and incorporating from 10% to 95% by weight, based on the total weight of the composite, of a multiplicity of non-linear, resilient, shape reforming BRF can be provided. The fibers can be concentrated on the surface of the panel in an amount of 10% or greater, or they can be distributed throughout the polymeric matrix in an amount of from preferably 20% to 75%. Optionally, the fibers can be applied to the surface as well as throughout the polymeric matrix. Flammability tests for the structure are conducted according to the Ohio State Burn Test and must meet the standard which is set forth in FAR 25.853.

Advantageously, conductivity of BRF for use in fire retarding and fire shielding assemblies can range from being electrically non-conductive to conductive having a specific resistivity of from $10^8$ to less than $10^0$ ohm-cm, a density of from 1.45 to 1.85 g/cm$^3$, and an elongatability of from 3 to 12%. These fibers are not sensitive to shear when they are electrically non-conductive but gradually become more sensitive to shear as the degree of carbonization increases from non-conductive to conductive. However, in view of the fact that the BRF always include a core of a thermoplastic polymer, the shear sensitivity will be substantially less for the fibers as compared to the fully carbonized fibers of the prior art. Accordingly, the BRF are slightly sensitive to shear as they become slightly conductive or conductive, but will become more so as the fibers become graphitic. Generally, low shear sensitivity produces less fiber breakage and hence provides for a greater population of longer fibers in all textile operations including the manufacture of non-woven assemblies such as battings, webbings, or the like. Low shear sensitivity becomes especially critical in the spinning of yarn from a fiber blend, in the manufacture of carpeting, woven fabrics, and the like. In the yarn spinning operation, there are several drafting operations which are high shear operations. Conventional carbonaceous fibers exhibit significant breakage of the fibers during these manufacturing operations unless the speed of operation of the manufacturing equipment is substantially reduced.

The present invention further resides in a means for synergistically improving the resistance to oxidation and thermal stability of the BRF in accordance with the general procedures described in U.S. Pat. No. 5,024,877, issued Jun. 18, 1991 to F. P. McCullough et al,. According to such procedure the BRF are blended with from 0.5 to 90% by weight of an organosilicone polymer derived from the hydrolyzed partial condensation product of a compound selected from the group consisting of $R_xSi(OR')_{4-x}$ and $R_xSi(OOR')_{4-x}$, wherein R is an organic radical and R' is a lower alkyl or phenyl radical, and x is at least 1 and less than 4. Preferably, the organosilicone polymer is selected from the group consisting of trimethoxymethylsilane and trimethoxyphenylsilane. BRF, when coated with as little as 0.5% of the organosilicone polymer exhibit substantially improved fire retardancy. Composites in which the organosilicone polymer is present in an amount of as much as 90% by weight of the composite are useful in applications such as gaskets, for example.

In accordance with one embodiment, the invention is directed to a composite which comprises a synthetic resin, such as a thermoplastic or thermosetting resin, that is compressed together with a batting of the BRF. Prior to compression, the batting is treated with an organosilicone polymer in an amount to provide enhanced ignition resistance. Generally, there is utilized up to about 20%, preferably about 10% by weight of a polymerizable silicone resin. Such a composite will be useful, particularly in forming fire resistant or flame shielding structural panels, for use in vehicles and installations, particularly airplanes.

In another embodiment, from 10 to 90%, preferably from 20 to 75% by weight of the BRF can be used in combination with a synthetic resin in fabricating a composite. The synthetic resin used in the composites can be selected from any of the conventional type polymeric materials such as thermoplastic or thermosetting polymers. Composites with a higher loading of the BRF are particularly useful in forming fire blocking structural panels, for use in vehicles and installations, particularly ships and airplanes.

Many composites and structures are possible and when prepared for a specific application will depend on the mechanical properties desired by the end-user. Generally, it has been found that BRF loadings of from 10 to 75% by weight are preferable for preparing flexible panels, in combination with the binder resins and/or organosilicone polymer or resin.

The present invention further relates to buoyant assemblies as disclosed in U.S. Pat. No. 4,897,303, issued Jan. 30, 1990 to F. P. McCullough et al,. employing BRF. Particularly preferred are the non-circular BRF that provide for a larger surface area and greater flexibility. A multiplicity of these fibers can form a batting or filling that has enhanced cohesiveness and in which the fibers form smaller interstitial spaces that provide the batting with improved buoyancy. In addition, the buoyant assembly is light weight and provides good thermal insulation, has a low water pick-up and is flame retardant In accordance with the procedure disclosed in U.S. Pat. No. 4,897,303, the BRF are coated with a water insoluble hydrophobic composition which can consist of any light weight, settable or curable composition that can be deposited as by spraying, dipping, and the like, so as to adhere to the fibers. Suitable compositions include high molecular weight waxes, haloaliphatic resins, thermoset and thermoplastic resins, ionomers, silicone products, polysiloxanes, and the like. Preferred coatings include polytetrafluoroethylene, polyvinylidene fluoride, polyvinyl chloride, etc. The buoyant assembly employing the BRF are particularly useful in articles such as fillers for personal apparel, e.g. jackets, sleeping bags, floatation equipment, and the like.

The electrically conductive BRF of the invention are particularly adapted for use in electrodes in secondary energy storage devices, esp. batteries. The BRF-B have a density of from 1.70 g/cm$^3$ to 1.87 g/cm$^3$, a log specific resistivity of less than $10^{-2}$ ohm-cm, a Young's modulus of from 3 to 30 million psi (20.7 to 207 GPa), an elongatability of from 2% to 5%, and a bending strain value of from 0.1 to 30%. These electrically conductive BRFs have greater flexibility as compared to commercially available electrically conductive carbon or graphite fibers that are carbonized throughout their cross section in view of the presence of the inner thermoplastic core. The present invention also relates to different types of electrodes, including bipolar electrodes and pseudo bipolar electrodes employing the linear or non-linear BRF-B. Various different types of batteries in which the BRF-B find utility are disclosed in U.S. Pat. No. 4,830, 938 and U.S. Pat. No. 4,865,931 to McCullough et al.

The flexible biregional graphitic fiber electrodes of the invention can also be readily adapted to other battery systems, particularly lithium ion cells, as disclosed in pending U.S. patent application Ser. No. 08/372,446, filed Jan. 13, 1995 in which a pseudo bipolar electrode has a portion thereof coated with a lithium salt of a metal oxide. In the lithium ion cell, the metallic lithium electrode is replaced by an anode which is based on a carbonaceous material which forms intercalation compounds with the lithium ions. The initial source of the lithium ions is the cathode material which can be a lithium metal oxide (lithiated metal oxide) such as, for example $LiCoO_2$; $LiNiO_2$ and $LiMn_2O_4$. There is never any metallic lithium in the lithium ion cell during normal operation and, accordingly, lithium ion cells are inherently safer than cells containing metallic lithium. During charge and discharge, the lithium ions are swinging through an organic non-aqueous electrolyte between the electrodes as electrical energy is introduced or withdrawn through an external electric circuit. More specifically, during the charge cycle the metal oxide gives up an electron to the carbonaceous material electrode, while lithium ions move from the cathode to the carbonaceous material electrode to form $C^-Li^+$. Currently chopped high modulus pitch fibers that are held together with a binder are used to achieve electrode flexibility. While this allows some freedom in electrode shape fabrication it does so at the expense of giving the electrode a high internal resistance due to the high contact resistance at each contact between each of the chopped carbon fibers. Using the continuous flexible BRF-B of the invention provides both the freedom of making the electrode into a variety of different shaped configurations, while lowering the internal resistance of the electrode by several orders of magnitude.

In a further embodiment, the terminal electrode of a lithium ion cell consisting of a substantially planar electrically conductive collector screen plate or sheet is provided with a metal oxide coating. A conductive screen can be made of any electrically conductive metal, preferably nickel, but can also be made of carbon or graphite that is coated with a conductive metal. The screen is provided with a coating of a lithium salt of a metal oxide of the empirical formula $Li(MO_2)_n$ in which M is a metal selected from the group consisting of VIIb and VIIIb. The metals are typically selected from the group consisting of Co, Ni and Mn, where n=1 for Co and Ni and n=2 for Mn.

In the usual manner, a terminal electrode, comprising a multiplicity of the BRF-B is positioned in a terminal cell. An internal cell separator wall divides the internal chamber of the housing into the pair of terminal cells. A pseudo bipolar electrode has a midportion thereof embedded in the separator wall itself or embedded in a potting resin provided in the separator wall for sealing the pseudo bipolar electrode in the wall and for preventing wicking of the electrolyte from one cell into the adjacent cell. The pseudo bipolar electrode is folded so that portions thereof are positioned in each of the terminal cells to form counter electrodes with the terminal electrodes.

The pseudo bipolar electrode is formed of a multiplicity of the BRF-B. A portion of the electrode fibers is provided with a coating of a lithium salt of a metal oxide of the empirical formula $Li(MO_2)_n$ in which M is a metal selected from the group consisting of VIIb and VIIIb. Preferably, the metals are selected from the group consisting of Co, Ni and Mn, where n=1 for Co and Ni and n=2 for Mn. Here again, the metal oxide coating is preferably selected from the group consisting of $CoO_2$; $NiO_2$ and $Mn_2O_4$. Each of the terminal electrodes is separated from its counter electrode by an electrically non-conductive, ion permeable planar, sheet like electrode separator each terminal electrode is provided with a current collector and a terminal, and the cells are provided with a non aqueous organic electrolyte.

Other energy storage devices that are contemplated to be within the scope of the present invention are those of a generally cylindrical shape and containing at least a pair of flexible carbon electrodes that are rolled up into a spiral or jelly roll type configuration, or that are positioned in a concentric relationship within the cylindrical housing as illustrated in FIGS. 4, 5 and 7 of copending EP application Serial No. 95202056.8, filed Jul. 27, 1995 by F. P. McCullough.

EXAMPLE 1

A 40 k (1 k=1000 fibers) tow of acrylic fibers containing approximately 94% acrylonitrile, 4% methacrylate and approximately 2% itaconic acid is made by the traditional wet spinning method. The acrylic fibers have an average diameter of 11 microns. The fiber tow is then oxidation stabilized in air while under tension at a temperature of 224° C. for 20 minutes. The density of the oxidation stabilized fiber is 1.25 g/cm$^3$. The fiber is cut and analyzed under a polarized light microscope and shows a clear differentiation between a black oxidation stabilized thermoplastic outer sheath and a translucent to lightly colored inner, non-oxidized thermoplastic core. The oxidized outer sheath of the fiber is not physically separated by a boundary or discontinuity from the non-oxidized core, when viewed in cross section. The ratio of the radius of the core to the radius of the fiber is measured and determined to be 1:1.29. The breaking twist angle was determined to be 18.5.

The stabilized precursor fibers are then texturized in a dynamic air stream and heat treated at a temperature of 550° C. in a tube furnace under a purged $O_2$ free $N_2$ atmosphere for 1.5 minutes while in a relaxed and unstressed condition. The resulting biregional fibers have an aspect ratio of greater than 10,000:1 and a nominal fiber diameter of 9.5 microns. The fibers are ignition resistant, non-flammable and flexible, have a bending strain value of 0.1%, a density of 1.54 g/cm³, a Young's modulus of 1 MM psi, a surface area of 3 m²/g, a bulk resistivity of $10^6$ ohm-cm, a breaking twist angle of 8.5, and a LOI of greater than 47. Analysis of the cross sectional area of a single fiber under a polarized light microscope shows a clear visual distinction between a black thermoset carbonaceous outer sheath and a translucent to lightly colored inner, non-oxidized thermoplastic core. The carbonized outer sheath of the fiber is continuous and is not physically separated from the thermoplastic core, when viewed in cross section, by a boundary or discontinuity.

The LOI values for various materials was determined and compared to the biregional precursor fiber and the ignition resistant, flexible biregional fiber of the invention. The results are set forth below:

| MATERIALS | LOI VALUES |
|---|---|
| Polypropylene | 17.4 |
| Polyethylene | 17.4 |
| Polystyrene | 18.1 |
| Rayon | 18.6 |
| Cotton | 20.1 |
| Nylon | 20.0 |
| Polycarbonate | 22 |
| Rigid Polyvinyl Chloride | 40 |
| BRPF | 40–44 |
| BRF | 40–55 |
| Graphite | 55 |

The above example was repeated using acrylic fibers made by the traditional wet spinning technique and containing approximately 94% acrylonitrile, 4% methacrylate and at least 0.01% of sub-micron impurities, i.e. particles, which are not removed by micro-filtration. Similar results are obtained, except that the fibers were slightly less stiff than the fibers made containing less than 0.01% submicron impurities. The fibers are ignition resistant, non-flammable and flexible and have a breaking twist angle of 8.0 degrees, and a LOI of 48

EXAMPLE 2

Several samples of a 6 k tow of fibers having a diameter of from 12 to 13 microns and of the same composition as in Example 1 were oxidation stabilized and then analyzed for density and ratio (r:R) of the core to the fiber. The analytical results of the tests are set forth in the Table III below:

TABLE III

| Sample | Time (min) | Temp (°C.) | Density (g/cm³) | r:R; r = 1 and R = | Volume % core | Volume % sheath |
|---|---|---|---|---|---|---|
| A | 100 | 194 | 1.264 | 6.25 | 2.6 | 97.4 |
| B | 10 | 196 | 1.206 | 1.13 | 79.0 | 21.0 |
| C | 20 | 224 | 1.218 | 1.29 | 60.5 | 39.5 |
| D | 30 | 224 | 1.245 | 1.40 | 51.0 | 49.0 |

From the Table above, it can be seen that the density and the degree of oxidation of the fiber increases with residence time. Sample A is not an example of the invention since the volume percentage for the core was not sufficient to effectively distinguish the fiber from fully oxidized fibers. At a ratio of 1:6.25, the core represents only about 2.6% by volume of the total volume of the fiber which is insufficient to impart to the fiber the desired biregional characteristics. At a ratio of 1:4, the percent volume for the core increases to about 51% with a corresponding decrease in the density of the fiber. From the data in the table, it can also be deduced that an increase in residence time and temperature results in an increase in density. Samples B, C and D, on microscopic inspection, clearly show a difference in texture and color between the core regions and the black oxidized outer sheath regions but do not show a boundary or discontinuity between the regions.

EXAMPLE 3

A tow of trilobal sub-acrylic fibers comprising 83% acrylonitrile, 14% vinyl chloride and 3% itaconic acid units is made by the traditional melt spinning technique and have a trilobal cross-section as shown in FIG. 2. The fibers are stretched during extrusion to attenuate the fibers and are then oxidatively stabilized in accordance with the procedure set forth in Example 1. The stabilized fibers are then carbonized at a temperature of 950° C. in a tube furnace under a purged $O_2$ free $N_2$ atmosphere for 1.5 minutes. The resulting fibers are non-flammable, have a nominal fiber diameter of 8.0 microns, an effective fiber diameter of 4 microns, and an aspect ratio of greater than 10,000:1 and an LOI of 47. The ratio of the radius of the core to the radius of the fiber is measured and determined to be 1:1.5. The fibers are flexible and have a bending strain value of 0.2%, a breaking twist angle of 7, a surface area of 11 m²/g, a density of 1.7 g/cm³, a Young's modulus of 4 MM psi, and a bulk resistivity of 0.085 ohm-cm. The surface of the fibers, when viewed in cross section under a polarized light microscope do not show a boundary or discontinuity between the regions.

EXAMPLE 4

A 40 k tow of the oxidation stabilized biregional precursor fibers, BRPF, made according to the procedure of Example 1 is textured by a standard crimping mechanism and is passed onto a conveyor belt without applying any stress or strain on the crimped tow. The crimped tow is then passed through a heated furnace maintained at a temperature of 950° C. The furnace is constantly purged with nitrogen. The residence time in the furnace is 1.25 min. A tow of these crimped ignition resistant biregional fibers is produced having a thermoset carbonaceous outer sheath and a thermoplastic inner core. The ratio of the radius of the core to the radius of the fiber is measured and determined to be 1:1.4. The density of the fiber is measured at 1.58 g/cm³ and the fibers have an LOI of greater than 47. The fibers are non-flammable and ignition resistant and have a bulk resistivity of $10^6$ ohm-cm, an elongation of 8%, a pseudoelongation of 15%, a breaking twist angle of 9.5 degrees, and a tenacity of 8 g/d. The crimped fiber tow is cut into various lengths of from about 6 to 7.5 cm and fed into a roller-top textile card. The fibers are separated by the carding treatment into a wool like fluff in which the fibers exhibit a high degree of interlocking as a result of the crimped configuration of the fibers, and a bulk density of 0.2 lb./ft³. The wool like fluff is suitable as a thermal insulating material for personal clothing articles such as Jackets, or the like, and has the same insulative effect as that of Goose or Duck Down (feathers) at a rate of about one-third the weight of Down as the insulating fill.

The fluff can be densified by needle punching in accordance with a procedure well known in the art. The fluff can also be treated with a thermoplastic binder such as a polyester, or the like, to form a mat or felt with enhanced cohesiveness and/or stiffness having good abrasion strength.

EXAMPLE 5

The non-flammability of the biregional fibers of the invention is determined following the test procedure set forth in 14 CFR 25.853(b). The test is performed as follows:

A minimum of three (3) 1"×6"×6" (2.54 cm×15.24 cm×15.24 cm) specimens derived from a batting of the biregional fibers of Example 3 are prepared. The specimens are conditioned by maintaining them in a conditioning room maintained at a temperature of 70° C.±3° C. and 5% relative humidity for 24 hours preceding the test.

Each specimen is supported vertically and exposed to a Bunsen or Turill burner with a nominal I.D. tube adjusted to give a flame height of 1.5 inches (3.8 cm). The minimum flame temperature is measured by a calibrated thermocouple pyrometer in the center of the flame and is 1550° F. (815.6° C.). The lower edge of the specimen is 0.75 inch (1.91 cm) above the top edge of the burner. The flame is applied to the cluster line of the lower edge of the specimens for 12 seconds and then removed.

Pursuant to the test, the material is self-extinguishing. The average burn length does not exceed 8 in. (20.3 cm), the average after flame does not exceed 15 seconds and flaming drippings did not continue to burn for more than 5 seconds after falling to the burn test cabinet floor.

EXAMPLE 6

A. Battings are made by blending an appropriate weight percent of each respective opened biregional non-conductive or antistat fibers in a blender/feed section of a sample size 12" (30.5 cm) Rando Webber Model B manufactured by Rando Machine Corp. of Macedon, N.Y. The batings produced typically are 1 inch (2.54 cm) thick and have bulk densities in a range of from 0.4 to 0.6 lb/ft$^3$ (6.4 to 9.6 kg/m$^3$). The battings are thermally bonded by passing the Rando batting on a conveyor belt through a thermal bonding oven at a temperature of about 120° C. to 150° C.

B. The battings from part A are immediately taken and formed into panels by compressing the opened fibers on a standard flat plate press at a pressure of 10,000 lb/ft$^2$ (700 kg/cm$^2$) to form panels of ¼" (0.635 cm) thickness. Flammability tests are run according to the procedure of the Ohio State Burn test which is set forth in FAR 25.853. The results are shown in the following Table IV with regard to the batings formed by the procedure of Part A:

TABLE IV

| Sample No. | Sample Compositon | Wt. % of each | Pass or Fail |
| --- | --- | --- | --- |
| 1 | BRF/PEB/PE | 10/20/70 | passed |
| 2 | BRF/PEB/PE | 20/20/60 | passed |
| 3 | BRF/PEB/PE | 25/20/55 | passed |
| 4 | OPF/PEB/PE | 10/20/70 | failed |
| 5 | BRF/PEB/Cotton | 10/10/80 | passed |
| 6 | Nomex ™/PEB/PE | 20/20/60 | failed |
| 7 | Nomex ™/PEB/PE | 50/20/30 | failed |

TABLE IV-continued

| Sample No. | Sample Compositon | Wt. % of each | Pass or Fail |
| --- | --- | --- | --- |
| 8 | OPF/PEB/Cotton | 50/15/35 | failed |
| 9 | BRF/PEB/Wool | 10/15/75 | passed |

PEB = 8 denier KODEL ™ 410 polyester binder fiber
BRF = Biregional fiber of Example 1
PE = 6 denier 2" staple DuPont DACRON ™ 164 polyester
Cotton = non-treated 1½" cotton staple
OPF = oxidized polyacrylonitrile fiber with a density of >1.40 g/cm$^3$
NOMEX ™ = DuPont m-aramid fiber

EXAMPLE 7

Following the procedure of Example 6 similar tests were performed on panels of ⅛" to 3/16" (0.32 cm to 0.48 cm) thickness, prepared according to the results as shown in the following Table V.

TABLE V

| Sample No. | Sample Compositon | wt. % of each | Pass or Fail |
| --- | --- | --- | --- |
| 1 | BRF/PEB/PE | 30/20/51 | passed |
| 2 | BRF/PEB/PE | 30/20/50 | passed |
| 3 | Nomex ™/PEB/PE | 20/20/60 | failed |
| 4 | Nomex ™/PEB/PE | 50/20/30 | failed |
| 5 | BRF/PEB/PE | 20/20/60 | passed |

EXAMPLE 8

In accordance with the procedure described in U.S. Pat. No. 5,024,877, issued Jun. 18, 1991 to F. P. McCullough et al, the following experiment is conducted:

A. To produce a flexible panel, a batting of the type described in Table III, Sample 3 is sprayed with a Dow Corning 1-2577 conformal coating (a hydrolyzed partial condensation of trimethoxy methyl silane) until 10% by weight of the coated batting comprises the coating. The coated batting is compressed on a platen between two vinyl sheets at 25 lb/in$^2$. (1.75 kg/cm$^2$) at a temperature of 260° F. (127° C.).

In lieu of the conformal coating, a silicone resin, which is polymerizable by either a heat condensation or a free radical condensation can be utilized.

EXAMPLE 8A
Ignition Resistance Test

The ignition resistance of the panels, utilizing the biregional fibers of the invention, is determined following the test procedure set forth in 14 CFR 25.853(b). The test is performed as follows:

A minimum of three battings each having a dimension of 2.5 cm×15 cm×30 cm and comprised of 80% of the biregional fibers and 20% polyester are prepared. The battings are sprayed with a solution of Dow Corning 1-2577 conformal coating (a hydrolyzed partial condensation of trimethoxy methyl silane) which cures by contact with moisture in air. The sprayed battings are compressed at 25 lb/in$^2$ (1.75 kg/cm$^2$) at a temperature of 260° F. (127° C.) to produce flexible panels. The coating is comprised of 10% by weight of the panels.

Standard vertical burn tests according to FAR 25.853b are conducted. The panels are conditioned by maintaining the specimens in a conditioning room maintained at a temperature of 21 ° C.±5° C. and 50%±5% relative humidity for 24 hours preceding the test. Each specimen is supported vertically and exposed to a Bunsen or Turill burner with a nominal I.D. tube adjusted to give a flame of 3.8 cm in height. The minimum flame temperature, measured by a calibrated thermocouple pyrometer in the center of the flame, is 843° C. The lower edge of the specimen is 1.9 cm above the top edge of the burner. The flame is applied to the center line of the lower edge of the specimens for 12 seconds and then removed.

The material is said to pass the test if the material is self-extinguishing, the average burn length does not exceed 20 cm, the average after-flame does not exceed 15 seconds, and there are no flame drippings. The material passed the test.

EXAMPLE 9

In accordance with the procedure described in U.S. Pat. No. 5,024,877, issued Jun. 18, 1991 to F.P. McCullough et al, the following experiment is conducted:

A multiplicity of biregional fibers of the invention as described in Example 3 in the form of a wool-like fluff is spread out and sprayed with an aerosol spray containing a fluoroalkane resin in a solvent comprising 1, 1, 1-trichloroethane sold under the trademark "SCOTCH-GARD" by Household Products Division of 3M. About 90% of the outside surface of the batting is coated. The fluff is then air dried to cure the coating and weighed. The fluff, when placed in water for two hours, floated. After two hours, the fluff is shaken, squeezed and weighed. Only about 0.1% water absorbency is detected. The coated fluff is suitable for use as a floatation aid and insulation for jackets, jumpsuits, and the like.

EXAMPLE 10

A) In accordance with the general procedure described in Example 1 of copending U.S. application Ser. No. 08/372, 446, a tow of trilobal acrylic fibers containing approximately 86% acrylonitrile, 13% methacrylate and at least 0.01% of sub-micron impurities, which are not removed by microfiltration, is extruded by the traditional melt spinning technique using a forming die with trilobally shaped extrusion orifices. The tow of acrylic fibers is stretched during extrusion of the fibers to attenuate the fibers and then oxidized in air for 25 min. in an oven in which the temperature is gradually increased from 250° C. to 300° C. The resulting precursor fibers are biregional and have an inner core of a thermoplastic polymer and an outer sheath of an oxidized, thermoplastic polymer. The oxidized outer sheath of the fiber is not physically separated from the thermoplastic core, when viewed in cross section, by a boundary or discontinuity. The core and sheath material of the biregional stabilized fiber, when viewed in cross-section, is continuous. The BRPF is tested for breaking twist angle at 20.5 The fiber has a LOI of 40. These fibers are useful in blends with other natural or synthetic fibers for jackets, sleeping bags and the like.

B) The stabilized precursor fibers of A) are placed in a tube furnace and treated at a temperature of 1000° C. under a purged $O_2$ free $N_2$ atmosphere for 2.0 minutes. The resulting fibers have a nominal fiber diameter of 6.8 microns, an effective fiber diameter of 4.2 microns and an aspect ratio of greater than 10,000:1. The resulting fibers have an inner core of a thermoplastic polymer and an outer carbonized sheath. The carbonized outer sheath of the fiber is not physically separated from the thermoplastic core, when viewed in cross section, by a boundary or discontinuity. The fibers are flexible and have a bending strain value of 0.1%, a breaking twist angle of 7.5 degrees, a Young's modulus of 5 MM psi, a surface area of 14 $m^2/g$, and a bulk resistivity of 0.035 ohm-cm. The ratio of the radius of the core to the radius of the fiber is measured and determined to be 1:1.9. The fibers are tested for ignition resistance and have an LOI value of 46. These fibers are useful as an electrode material for secondary batteries and as the conductive component for very light weight, thin, flexible measurement electrodes for a portable EKG monitor.

C) The biregional carbonized fibers of B) are placed in a high temperature tube furnace and treated at a temperature of 1750° C. under a purged $O_2$ free $N_2$ atmosphere for 1.2 minutes. The resulting biregional graphitized fibers have a nominal fiber diameter of 6.4 microns, an effective fiber diameter of 4.0 microns and an aspect ratio of greater than 10,000:1. The fibers are flexible, have a bending strain value of 0.1%, a breaking twist angle of 5.5, a Young's modulus of 18 MM psi, a surface area of 12 $m^2/g$, and a bulk resistivity of 0.0035 ohm-cm. The ratio of the radius of the core to the radius of the fiber is measured and determined to be 1:2. These fibers are useful as an electrode material for secondary batteries and as the conductive component for very light weight, thin, flexible measurement electrodes for a portable EKG monitor.

EXAMPLE 11

A tow of trilobal acrylic fibers containing approximately 86% acrylonitrile, 13% methacrylate and at least 0.01% of sub-micron impurities, which are not removed by microfiltration, is made by traditional melt spinning techniques using a forming die with trilobal shaped extrusion holes. The tow of acrylic fibers is stretched during extrusion of the fibers to attenuate the fibers and then oxidized in air for 1.5 hrs in an oven in which the temperature is gradually increased from 250° C. to 300° C. followed by carbonization at 1200° C. in a tube furnace under a purged $O_2$ free $N_2$ atmosphere for 10 minutes. An analysis of the trilobal fibers under a polarized light microscope show two regions in each fiber which are clearly visually distinguishable from each other by a black thermoset carbonaceous outer sheath region and a translucent or colorless inner, non-oxidized, thermoplastic core region. The carbonized outer sheath of the fiber is not physically separated from the thermoplastic core, when viewed in cross section, by a boundary or discontinuity and is continuous.

The resulting ignition resistant biregional fibers are ignition resistant and have an LOI value of 45. The biregional fibers are flexible and have a bending strain value of 0.1%, a breaking twist angle of 7 degrees, a Young's modulus of 11 MM psi, a nominal fiber diameter of 6.8 microns, an effective fiber diameter of 4.2 microns, a surface area of 18 $m^2/g$ and a specific resistivity of 0.035 ohm-cm and an aspect ratio of greater than 10,000:1. These fibers are useful as a battery electrode material for secondary batteries and as the conductive component for very light weight, thin, flexible measurement electrodes for a portable EKG monitor.

EXAMPLE 12

A tow of pentalobal sub-acrylic fibers comprising 80% acrylonitrile, 17% vinyl chloride and 3% itaconic acid units is made by traditional melt spinning techniques and has a pentalobal cross-section as shown in FIG. 2A. The tow of acrylic fibers is stretched during extrusion of the fibers to attenuate the fibers and is then oxidized in air for 1.5 hours at a temperature of from 250° C. to 300° C. followed by carbonization at a temperature of 1100° C. in a tube furnace under a purged $O_2$ free $N_2$ atmosphere for 5 minutes. An analysis of the fibers under a polarized light microscope show two regions in each fiber which are clearly visually distinguishable from each other by a black thermoset carbonaceous outer sheath region and a translucent or colorless inner, non-oxidized, thermoplastic core region. The carbonized outer sheath of the fiber is not physically separated from the thermoplastic core, when viewed in cross section, by a boundary or discontinuity. The core and sheath material of the biregional fiber, when viewed in cross-section, is continuous.

Further analysis of the fibers show that they are flexible, have a bending strain value of 0.2%, a breaking twist angle of 5 degrees, a Young's modulus of 4 MM psi, a nominal fiber diameter of 8.0 microns, an effective fiber diameter of 4 microns, a surface area of 22 $m^2/g$, a specific resistivity 0.045 ohm-cm, and an aspect ratio of greater than 1000:1. These flexible biregional fibers are useful as a battery electrode material for secondary batteries and as the conductive component for very light weight, thin, flexible measurement electrodes for a portable EKG monitor.

EXAMPLE 13

Two secondary batteries, each containing two terminal cells are constructed using electrodes made from the ignition resistant biregional fibers produced in examples 11 and 12, respectively. The batteries are similar in construction to the rectangular battery shown in FIG. 1 of copending EP Patent Application No. 95202056.8, filed Jul. 27, 1995 (Publication No. 0698935). The electrodes of each cell consist of thin planar sheets made from tows of the ignition resistant biregional fibers and have a dimension of 4 $in^2$ (25 $cm^2$). A thin copper busbar, forming an electron collector strip, is applied to the fiber ends along one edge of the electrode by dipping the fiber ends into a copper sulfate solution thereby slowly electroplating the copper from the copper sulfate solution onto the fiber ends until a solid collector strip has grown along the edge of the planar electrode sheet. A terminal connector is attached by soldering to one end of the collector strip. The collector strip is covered with a non-conductive Derakane™ resin coating. A non-woven polypropylene scrim having a thickness of 180 to 200 micrometer is positioned between the electrode sheets for use as a separator sheet. An electrolyte comprising 20% $LiPF_6$ in propylene carbonate is dried to less than 5 ppm $H_2O$ using highly activated zeolite molecular sieves. The electrodes and separator are dried and assembled in a dry box containing air less than 1 ppm water. This assembly is placed into a housing of PVC having a wall thickness of 2 mm. The PVC housing is provided on the outer surface with an aluminum foil having a thickness of 50 microns. The housing is filled with the dried electrolyte and 1.5 g of highly activated zeolite molecular sieves. The housing is then sealed with the collector strips and terminals of each electrode potted in a Derakane™ brand vinyl ester resin seal and protruding through the top of the housing lid. The completed assembly is then removed from the dry box and tested as a battery cell. The cell is electrically charged at a potential of 5.25 to 5.5 volts and discharged by 90% of its charge capacity. Each cell typically has a coulombic efficiency of greater than 99%. The cell is capable of over 800 cycles without loss of capacity or efficiency.

EXAMPLE 14

Two bipolar, two cell, batteries are constructed as disclosed and illustrated in U.S. Pat. No. 4,830,938, using the two types of biregional fibers prepared in examples 11 and 12. The electrolyte and housing material having two compartments are the same as used in Example 13. The total thickness across each bipolar battery is approximately 1 cm. The bipolar electrode, being twice the size of the respective terminal electrodes, is passed through the cell wall connecting the two cells and potted in a Derakane™ resin. This cell is charged and discharged repeatedly. Charging was done at a potential of 15 volts. Open circuit voltage on full charge is over 9 volts. The coulombic efficiency is typically over 99%.

EXAMPLE 15

A secondary lithium ion battery, containing two terminal cells with one pseudo bipolar connecting electrode is constructed using the BRFs produced in example 12. The battery is similar in construction to the battery shown in FIG. 5 of U.S. patent application Ser. No. 08/372,446, filed Jan. 13, 1995 in the name of F. P. McCullough. The electrodes of each cell consist of thin planar sheets made from the tows of fibers and having a dimension of 4 $in^2$ (25 $cm^2$). A thin nickel busbar, forming an electron collector strip, is applied to the fiber ends along one edge of the terminal electrode by dipping the fiber ends into a nickel salt containing solution thereby slowly electroplating the nickel from the solution onto the fiber ends until a solid collector strip has grown along the edge of the planar electrode sheet. A terminal connector is attached, by soldering to one end of the collector strip. The collector strip is potted into the top of the cell wall which is comprised of a non-conductive Derakane™ resin coating. A very thin coating of nickel is also plated onto a half portion of the pseudo bipolar electrode to which a coating of $LiCoO_2$ active material is applied. A non-woven polypropylene scrim having a thickness of 180 to 200 micrometer is positioned between the electrode sheets for use as a separator sheet. An electrolyte comprising 10% $LiPF_6$ in propylene carbonate is dried to less than 5 ppm $H_2O$ using highly activated zeolite molecular sieves. The electrodes and separator are dried and assembled in a dry box containing less than 1 ppm water. This assembly is placed into a housing of PVC having a wall thickness of 2 mm. The PVC housing is provided on the outer surface with an aluminum foil having a thickness of 50 microns. The housing is filled with the dried electrolyte and 1.5 g of highly activated zeolite molecular sieves. The housing is then sealed with the collector strips and terminals of each electrode potted in a Derakane™ brand vinyl ester resin seal and protruding through the top of the housing lid. The completed assembly is then removed from the dry box and tested as a battery cell. The cell is electrically charged, then discharged by 80% of its charge capacity. The working voltage of the cell is 3.8V. Each cell has a coulombic efficiency of greater than 98%.

EXAMPLE 16

A sheath-core precursor fiber is made from two polymeric compositions by coextrusion spinning to form a fiber having an acrylic sheath and modacrylic core. This fiber is then stabilized for 12 minutes and carbonized for 1 minute following the procedure of example 1 to form BRF (sheath-core). The ratio of the radius of the core with respect to the total radius of the fiber is 1:1.2. The resulting biregional fiber is ignition resistant and has an LOI of 48 and a breaking-twist angle of 10 degrees.

What is claimed is:

1. A biregional fiber comprising an inner core region of a thermoplastic polymeric composition and a surrounding outer sheath region of a thermoset carbonaceous material, wherein said fiber is ignition resistant and has an LOI value of greater than 40.

2. The fiber of claim 1, wherein the ratio (r:R) of the radius of the inner core region (r) with respect to the total radius of the fiber (R) is from 1:4 to 1:1.05.

3. The fiber of claim 1, wherein said carbonized outer sheath region has a carbon content of greater than 68% by weight, a density of from 1.45 to 1.87 g/cm$^3$, and a bulk resistivity of from $10^8$ to less than $10^{-2}$ ohm-cm.

4. The fiber of claim 1, wherein said fiber is flexible, has a bending strain value of from greater than 0.01 to less than 50%, and a Young's modulus of from greater than 0.3 MM psi (2.0 GPa) to 50 MM psi (345 GPa).

5. The fiber of claim 1, having a breaking twist angle of from 4 to 13 degrees.

6. The fiber of claim 1, wherein said fiber is crimped and has an elongatability to break of from 2 to 12%, and a reversible deflection ratio of greater than 1:1.

7. The fiber of claim 3, having a surface area of from greater than 1 to 150 m$^2$/g, and a contiguous fiber surface that is substantially free of pits and pores, said surface having micropores representing less than 5% of the total surface area of the fiber.

8. The fiber of claim 1, having a generally circular, non-circular, or tubular cross-sectional shape, and a diameter of from 1 to 30 micrometers.

9. The fiber of claim 1, wherein said polymeric precursor composition comprises a homogeneous acrylic composition, and wherein said inner core region of said fiber and said outer sheath region are continuous and do not present an intermediate boundary or discontinuity between the regions.

10. The fiber of claim 1, having a coating of an organo-silicone polymer derived from the hydrolyzed partial condensation product of a compound selected from the group consisting of $R_xSi(OR')_{4-x}$ and $R_xSi(OOR')_{4-x}$, wherein R is an organic radical and R' is a lower alkyl or phenyl radical, and x is at least 1 and less than 4.

11. The fiber of claim 1, having a coating of a water insoluble hydrophobic composition comprising a settable or curable composition selected from high molecular weight waxes, haloaliphatic resins, thermoset and thermoplastic resins, ionomers, silicone products, and polysiloxanes.

* * * * *